(12) United States Patent
Cruz

(10) Patent No.: US 9,124,097 B2
(45) Date of Patent: Sep. 1, 2015

(54) POLARITY CORRECTING DEVICE

(75) Inventor: Paul M. Cruz, San Diego, CA (US)

(73) Assignee: International Safety and Development, Inc., El Cajon, CA (US)

( * ) Notice: Subject to any disclaimer, the term of this patent is extended or adjusted under 35 U.S.C. 154(b) by 616 days.

(21) Appl. No.: 13/338,031

(22) Filed: Dec. 27, 2011

(65) Prior Publication Data

US 2012/0293018 A1 Nov. 22, 2012

Related U.S. Application Data

(60) Provisional application No. 61/428,162, filed on Dec. 29, 2010.

(51) Int. Cl.
*H02H 11/00* (2006.01)

(52) U.S. Cl.
CPC ............ *H02H 11/002* (2013.01); *Y10T 307/839* (2015.04)

(58) Field of Classification Search
CPC ...................................................... H02H 11/002
USPC .......................................................... 307/127
See application file for complete search history.

(56) References Cited

U.S. PATENT DOCUMENTS

| | | |
|---|---|---|
| 3,308,365 A | 3/1967 | St. John |
| 3,313,995 A | 4/1967 | Bach et al. |
| 3,413,487 A | 11/1968 | Gershen |
| 3,624,338 A | 11/1971 | Ellis et al. |
| 3,626,201 A | 12/1971 | Chambers et al. |
| 3,648,059 A | 3/1972 | Beaudry et al. |
| 3,809,961 A | 5/1974 | Kershaw |
| 4,028,594 A | 6/1977 | Schossow |
| 4,204,243 A | 5/1980 | Ross |
| 4,319,144 A | 3/1982 | King et al. |
| 4,360,847 A | 11/1982 | Bloomer et al. |
| 4,393,432 A | 7/1983 | Neuhaus et al. |
| 4,463,402 A | 7/1984 | Cottrell |
| 4,471,400 A | 9/1984 | Reza |
| 4,520,419 A | 5/1985 | Locher et al. |
| 4,769,586 A | 9/1988 | Kazmierowicz |
| 4,843,514 A | 6/1989 | Bodkin |
| 5,182,466 A | 1/1993 | Ohkubo |
| 5,194,758 A | 3/1993 | Ver Meer |
| 5,485,339 A | 1/1996 | Dufresne |
| 5,508,603 A | 4/1996 | Strong, III |
| 5,519,559 A * | 5/1996 | Dides et al. ...................... 361/84 |
| 5,541,800 A * | 7/1996 | Misencik ........................ 361/45 |
| 6,040,969 A * | 3/2000 | Winch et al. .................... 361/82 |
| 6,262,492 B1 | 7/2001 | Sheng |

(Continued)

OTHER PUBLICATIONS

Goodwin, Antuan, Michelin Smart Jumper Cables for Easier Jump-starts, CNET Reviews, May 16, 2011, http://reviews.cnet.com/8301-13746_7-20063320-48.html, accessed Nov. 4, 2013.

*Primary Examiner* — Adi Amrany

(74) *Attorney, Agent, or Firm* — Knobbe Martens Olson & Bear LLP

(57) ABSTRACT

Embodiments disclosed herein relate generally to a device for correcting the polarity of electricity in a circuit. In direct current circuits, a positive voltage received from a power source will exit the device at a predetermined output regardless of which input of the device received the positive voltage. In alternating current circuits, one or more currents received from a hot output(s) of a power source will be connected to a predetermined output(s) of the device regardless of which input(s) received the current(s).

5 Claims, 13 Drawing Sheets

(56) References Cited

U.S. PATENT DOCUMENTS

| | | | |
|---|---|---|---|
| 6,657,839 B2* | 12/2003 | de Oliveira | 361/91.6 |
| 6,738,238 B2 | 5/2004 | Lontka et al. | |
| 6,920,025 B2* | 7/2005 | Nelson | 361/42 |
| RE39,446 E* | 12/2006 | Winch et al. | 361/82 |
| 7,190,246 B2* | 3/2007 | Angle et al. | 335/128 |
| 7,869,173 B2* | 1/2011 | Kempler | 361/42 |
| 8,139,328 B2* | 3/2012 | DiSalvo et al. | 361/42 |
| 8,376,782 B2* | 2/2013 | Govekar | 439/652 |
| 2006/0268472 A1* | 11/2006 | Winch | 361/42 |
| 2008/0025058 A1 | 1/2008 | Gerber | |

* cited by examiner

POLARITY CORRECTING DEVICE

CROSS-REFERENCE TO RELATED APPLICATIONS

This application claims the benefit of U.S. Provisional Application No. 61/428,162 filed on Dec. 29, 2010, entitled "POLARITY CORRECTING DEVICE," which is hereby incorporated by reference in its entirety.

BACKGROUND OF THE INVENTION

1. Field of the Invention

Embodiments disclosed herein relate generally to a device for correcting the polarity of electricity in a circuit.

2. Background

Electrical devices may be powered by a direct current ("DC") provided by a battery or battery pack or other DC power source, or by alternating current ("AC") provided by plugging a cord attached to such device into an AC powered outlet. Some devices are configured to receive alternating current and to convert the alternating current into a direct current for operation of the device.

Alternating current is typically provided to most businesses and households by a company which operates generators to produce electricity and power lines to distribute the electricity. The electricity may be produced using a variety of means, for example by burning coal, oil, or natural gas, or by using steam or nuclear generators. In some instances, electricity is produced by hydroelectric power, for example by use of a spinning water wheel in a dam. Generally, the electricity is transported over the power lines at a very high voltage, and is converted to a lower voltage using transformers that are closer in proximity to the businesses and households than the generators. Thus, businesses and households may receive alternating current from a power source external to the household or business, and sometimes located at a great distance. Businesses or households may also receive alternating current from private or local generators or other such power sources.

Connecting the alternating current provided by the power source to an electrical outlet, thereby causing the outlet to be powered, allows an electrical device that requires alternating current to receive power by plugging a cord attached to the electrical device into the outlet. There are various outlet configurations, including outlets having receptacles with two terminals, three terminals, and four terminals. Receptacles may include various combinations of hot, neutral, and ground terminals.

Hot terminals are designed to carry an electric current when the outlet is connected to a power source. Neutral terminals are designed to carry an electric current when a circuit is created between the hot terminal and the neutral terminal, for example by an electrical device being plugged into the socket. In the absence of a circuit being created between the hot terminal and the neutral terminal, however, the neutral terminal generally does not carry a current. The ground terminal also generally does not carry an electric current, and is provided as a safety measure. Typically, the ground terminal is connected to a natural ground and provides a path having low impedance that a current can follow when a short occurs in a device plugged into the socket.

Improper wiring of outlets may cause one or more of the hot, neutral, and ground terminals of the outlet to be configured incorrectly, resulting in a potentially deadly condition. A device cord plugged into the improperly wired outlet will receive current at a prong of the cord which is not designed to accept current, which can be very dangerous. For example, the casing of a device plugged into an improperly wired outlet may be live and a user of the device that contacts the casing may be electrocuted. Further, improperly powered devices may in some circumstances explode, for example due to elements in the device receiving a current even when the device is off, or may be severely damaged or rendered non-operational. Devices that require direct current may suffer from similar problems when current is running in the opposite direction than it was intended, and may be damaged or pose a danger to users due to elements of the device being unintentionally charged, for example.

As can be seen from the dangers described above, which are only a few of the possible dangers, outlets that are wired incorrectly and direct current sources providing current in an unintended direction pose a threat to users of electrical devices. Incorrect wiring, however, is common in many business and households. Such incorrect wiring may be due to inexperienced electricians performing the wiring. In some cases, even experienced electricians incorrectly wire outlets or devices, for example when wires connecting the outlet to a power source and to a neutral and/or ground path are mislabeled or are not labeled at all.

Thus, devices which correct the polarity of a received voltage, thereby ensuring that a positive or hot voltage will always exit the devices at predetermined outputs, are needed.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features described herein provide advantages including correcting the polarity of electricity provided in a circuit.

In one embodiment, an electrical device includes a first switching contact; a first set of terminals comprising a first common terminal, a first normally closed terminal, and a first normally open terminal; a second set of terminals comprising a second common terminal, a second normally closed terminal, and a second normally open terminal; a persistent connection between the first switching contact and the first common terminal; a persistent connection between the first normally closed terminal and the second normally open terminal; a persistent connection between the second normally closed terminal and the first normally open terminal; a first output in connection with the first normally closed terminal and the second normally open terminal; a second output in connection with the second normally closed terminal and the first normally open terminal; a first input connected to the first switching contact; and a second input connected to the second common terminal. In the device described, energizing the first switching contact causes the first common terminal to switch from connecting to the first normally closed terminal to connecting to the first normally open terminal. Further, energizing the first switching contact also causes the second common terminal to switch from connecting to the second normally closed terminal to connecting to the second normally open terminal. The first and second inputs of the device are configured for connection to a hot output of an electrical power source, and a current received from the hot output of the electrical power source is connected to the second output when the hot output is received at the first input or when the hot output is received at the second input.

In another embodiment, an electrical device includes a first and a second switching contact; a first set of terminals comprising a first common terminal, a first normally closed terminal, and a first normally open terminal; a second set of terminals comprising a second common terminal, a second normally closed terminal, and a second normally open terminal; a third and a fourth switching contact; a third set of terminals comprising a third common terminal, a third normally closed terminal, and a third normally open terminal; a fourth set of terminals comprising a fourth common terminal, a fourth normally closed terminal, and a fourth normally open terminal; a fifth set of terminals comprising a fifth common terminal, a fifth normally closed terminal, and a fifth normally open terminal; a sixth set of terminals comprising a sixth common terminal, a sixth normally closed terminal, and a sixth normally open terminal; a persistent connection between each of the switching contacts and a respective common terminal of the terminal sets; a persistent connection between the first normally closed terminal and the third switching contact; a persistent connection between the first normally open contact and the fourth normally open contact; a persistent connection between the second normally open contact and the third normally open contact and the fourth normally closed contact; a first output in connection with the first normally open terminal and in connection with the fourth normally open terminal; a second output in connection with the third normally closed terminal; a third output in connection with the second normally open terminal and in connection with the third normally open terminal and in connection with the fourth normally closed terminal; a first input connected to the first switching contact; a second input connected to fifth common terminal; and a third input connected to the second switching contact. In the device, energizing the first and second switching contacts causes the first common terminal to switch from connecting to the first normally closed terminal to connecting to the first normally open terminal. In addition, energizing the first and second switching contacts also causes the second common terminal to switch from connecting to the second normally closed terminal to connecting to the second normally open terminal, and further causes the fifth common terminal to switch from connecting to the fifth normally closed terminal to the fifth normally open terminal. Energizing the third and fourth switching contacts causes the third common terminal to switch from connecting to the third normally closed terminal to connecting to the third normally open terminal. In addition, energizing the third and fourth switching contacts also causes the fourth common terminal to switch from connecting to the fourth normally closed terminal to connecting to the fourth normally open terminal, and further causes the third and fourth switching contacts causes the sixth common terminal to switch from connecting to the sixth normally closed terminal to the sixth normally open terminal. The first, second and third outputs of the device are configured for connection to a load, and the first, second, and third inputs are configured for connection to two hot outputs of an electrical power source.

In yet another embodiment, an electrical apparatus includes first and second means for receiving a hot output of an alternating current source; means for inducing a magnetic field when the alternating current is received at the first means for receiving; means for selectively connecting a first contact to one of a second and a third contact; means for selectively connecting a fourth contact to one of a fifth and a sixth contact; means for carrying a current from the first means for receiving to the first contact; means for carrying a current from the second means for receiving to the fourth contact; means for carrying a current from the second contact to the sixth contact; means for carrying a current from the third contact to the fifth contact; a first means for outputting an electrical current; and a second means for outputting an electrical current. The first contact is connected to the second contact except when the magnetic field is induced, and the fourth contact is connected to the fifth contact except when the magnetic field is induced. The first means for outputting is in connection with the third contact and the fifth contact, and the second means for outputting is in connection with the sixth contact and the second contact. A current received from the hot output of the alternating current source is connected to the first means for outputting when the hot output is received at the first means for receiving or when the hot output is received at the second means for receiving. The means for inducing a magnetic field may comprise a coil in connection with a first switching contact and a second switching contact. The device may comprise a double throw relay, wherein the first and fourth contacts comprise common contacts of the relay, the second and fifth contacts comprise normally closed contacts of the relay, and the third and sixth contacts comprise normally open contacts of the relay.

In still another embodiment, an electrical apparatus includes first input means and second input means for receiving one of a hot output of an alternating current source and a neutral wire or path on either one of the first input means and second input means; a first means for outputting an electrical current; a second means for outputting an electrical current; and means for connecting the first input means and the second input means to the first output means and the second output means such that the hot output of the alternating current source is connected to the first means for outputting when the hot output is received at the first means for receiving or when the hot output is received at the second means for receiving.

BRIEF DESCRIPTION OF THE DRAWINGS

The figures provided herein are not drawn to any particular proportion or scale, and many variations can be made to the illustrated embodiments. Those of skill in the art will recognize that the disclosed aspects and features shown herein are not limited to any particular embodiment, and that features illustrated in separate figures may in some embodiments be combined.

DETAILED DESCRIPTION OF CERTAIN INVENTIVE EMBODIMENTS

Figure 1A:
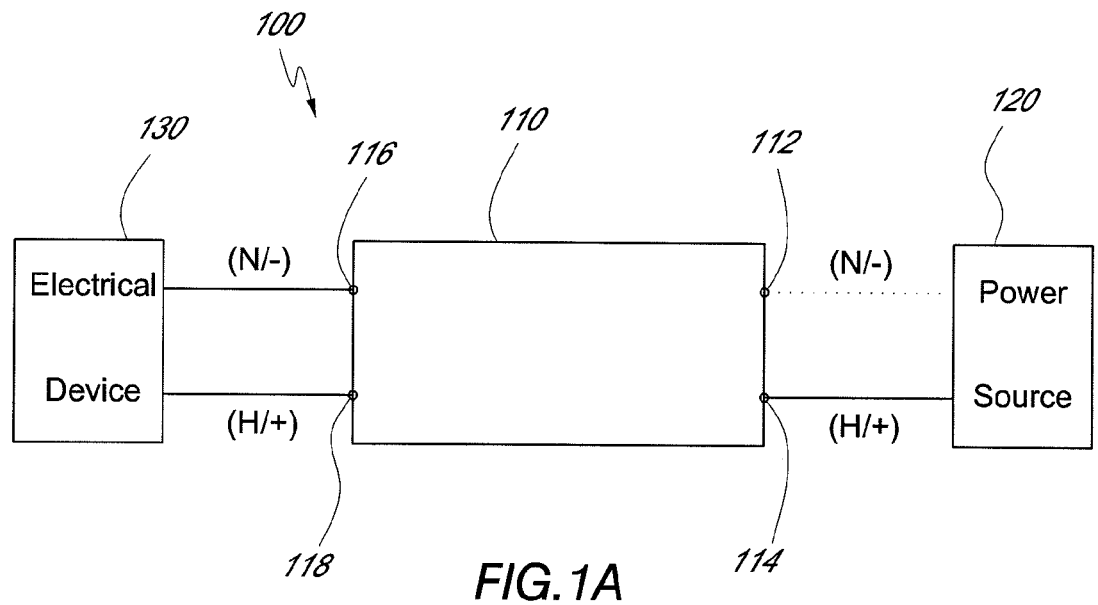
FIG. 1A is a block diagram illustrating a device, having two inputs, for correcting the polarity of electricity in a circuit, where the polarity output from the device is the same as the input polarity.

Certain embodiments described herein provide a system and device for correcting the polarity of electricity in a circuit, and the following detailed description is directed to certain sample embodiments. A multitude of different embodiments are plausible to one skilled in the art as defined and covered by the claims. In this description, reference is made to the drawings wherein like parts are designated with like numerals throughout. Individual letters are added as a suffix to the reference numerals when describing individual or varying embodiments of the features. For example, inputs 112a, 112b, etc., described below, are like features as described in reference to the inputs 112, but may be embodied in different configurations, such as being defined at different locations on a polarity-correcting device.

Figure 1B:
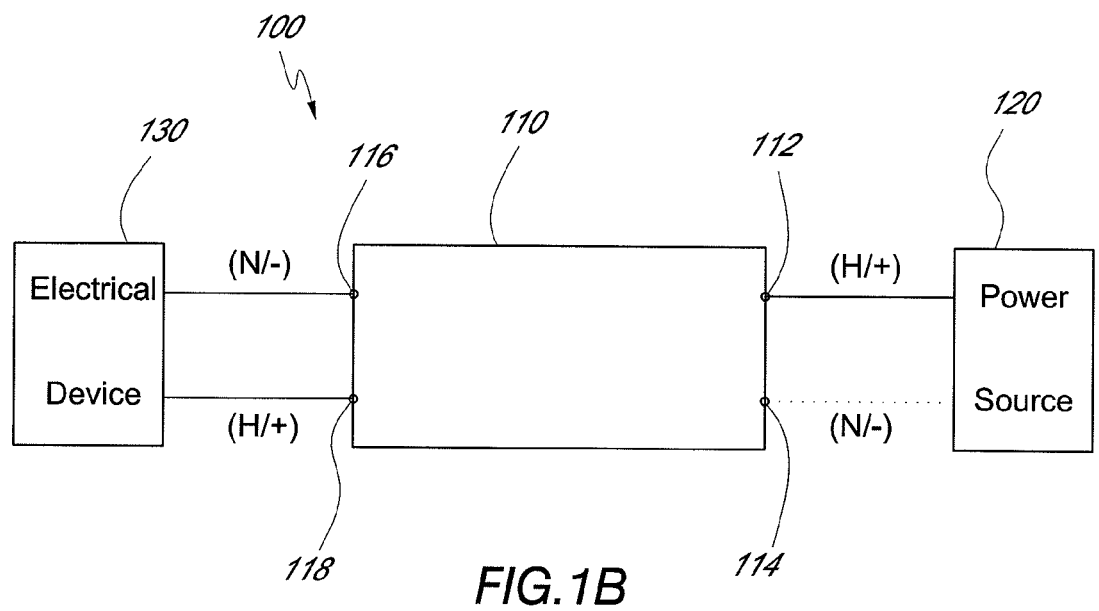
FIG. 1B is a block diagram illustrating the device of FIG. 1A, where the polarity output from the device is reversed as compared to input polarity.

FIGS. 1A and 1B are block diagrams illustrating a device 110 for correcting the polarity of electricity in a circuit 100. The device 110 is configured for connection to a power source 120 and an electrical device 130. The power source 120 may comprise any device configured to provide a charge, voltage, or current. In some embodiments the power source 120 comprises or is electrically connected to a source of alternating current, for example a generator operated by a utilities company. In other embodiments, the power source 120 comprises a source of direct current, for example a battery pack. The electrical device 130 may comprise any device that includes an element or functionality that operates using electricity, or any electrical load connected to the device 110. The electrical device 130 is configured to receive a hot or positive output from a power source, and is further configured to have a negative or neutral wire or path, which is described in additional detail below. In some embodiments, the electrical device 130 comprises any equipment or mechanism configured to conduct electricity or provide a circuit across the device 110. In some embodiments, the device 110 comprises a machine such as an automobile or comprises a source of power or energy in addition to the power source 120, for example when the device 110 is placed between two batteries in order to charge one of the batteries. Of course, the power source 120 and/or the electrical device 130 may each comprise a plurality of devices or apparatuses. For example, the power source 120 may comprise a plurality of batteries connected together in a series configuration.

The power source 120 may provide any number of voltages and currents to the device 110. When the power source 120 comprises a source of alternating current, a voltage (measured as a root mean squared, or "RMS," value) supplied by the power source 120 may equal, for example, approximately 110, 120, 220, 230, 240, 460, or 480 volts. When the power source 120 comprises a source of direct current, a voltage supplied by the power source 120 may equal, for example, 1.5, 6, 9, 12, or 20 volts, or a combination of these voltages. Those of skill in the art will appreciate that voltages other than those enumerated above may be supplied by the power source 120 to the device 110.

As can be seen in the figures, the device 110 comprises a first input 112 and a second input 114. The first and second inputs 112 and 114 are configured to accept the voltages and currents output by the power source 120. When the power source 120 comprises a source of alternating current, a line or wire carrying current supplied by the power source 120 is referred to as "hot." Both inputs 112 and 114 are configured to accept a hot output from the power source 120. When one of the inputs 112 and 114 is connected to a hot output of the power source 120, the other input may be connected to a neutral wire or path. The neutral wire carries current from the hot wire when a complete circuit is created between the hot and neutral wires, for example by the electrical device 130. Although the neutral wire is shown as being connected to the power source 120 in FIGS. 1A and 1B, the neutral wire may actually be connected to a ground, for example the earth. The neutral wire may pass through an electrical panel before being connected to ground, and may be commonly connected to other neutral wires from other devices. When the electrical device 130 is connected to the hot output and the neutral wire, power may be supplied to the electrical device 130 by the power source 120, thereby allowing the device to operate.

When the power source 120 comprises a source of direct current, one connection to or terminal of the power source 120 will have a higher electric potential than the other connection or terminal. The terminal with the higher electric potential is referred to as a positive terminal, while the terminal with the lower electric potential is referred to as a negative terminal. In conventional notation, when the electric device 130 is connected to the positive and negative terminals of the power source 120 so as to form a complete circuit, current will flow from the positive terminal, through the electric device 130, and return to the power source 120 via the negative terminal, thereby powering the device.

As can also be seen in the figures, the device 110 further comprises a first output 116 and a second output 118. At least one of the first and second outputs 116 and 118 is configured to provide a current and voltage to the electrical device 130, either directly or by way of an intermediate device or mechanism, as will be described in more detail below.

The device 110 is configured such that a current and voltage supplied by the power source 120 to one of the first and second inputs 112 and 114, for example an alternating current or direct current supplied as described above, will pass through the device 110 and be provided to the electrical device 130 by one of the first and second outputs 116 and 118. When a complete circuit is created, for example by the electrical device 130 when the electrical device 130 is powered "on," the current will return to the electrical device 110 via whichever of the first and second outputs 116 and 118 did not provide the current to the electrical device 130. This return current will pass through the device 110 and return to the power source 120, or to a ground as described above, via whichever of the first and second inputs 112 and 114 did not carry the current to the device 110 from the power source 120.

Those of skill in the art will appreciate that although current is described above as being provided by the power source 120 to the device 110, current may actually flow in a direction towards and/or away from the power source 120. Similarly, although the electrical device 120 is described above as accepting current from the power source 120 and providing current to the electrical device 130, those of skill in the art will appreciate that current may actually flow in a direction towards and/or away from the device 110. For example, when using conventional notation as described above, current will flow away from the positive terminal of a direct current power source, through the device 110, into and out of an electrical device, back through the device 110, and back towards the negative terminal of the direct current power source. Using other forms of notation, the current may be described as flowing in the opposite direction. When the device 110 is connected to an alternating current power source, the current will alternate and may periodically flow in a direction either towards or away from the power source. Thus, those of skill in the art will understand that the terms input, output, enter, and exit, among others, are not limiting as to the direction of current flow in and/or through the device 110. In alternating current, current may sometimes be described as reverberating or vibrating in periodically different directions. Thus, descriptions of current flowing through a device or from one location to another are not limited to any particular electron or positive charge passing from one area or location to another, but rather describe the general flow of electric potential, energy, and/or power.

In the illustrated embodiment, the device 110 is configured such that a hot or positive output received by the device 110 will always exit the device 110 at the second output 118. Regardless of whether the hot or positive output is received at the second input 114, as shown in FIG. 1A, or at the first input 112, as shown in FIG. 1A, the hot or positive output will exit the device 110 at the second output 118. Similarly, the first output 116 will be connected to a neutral or negative wire or path. Thus, regardless of whether the neutral wire or path is connected to the device 110 at the first input 112 or the second input 114, the neutral wire or path will always form a connection with the first output 116. The relative arrangement of what is designated as a particular output (e.g., first output) can be changed as one of skill in the art will appreciate. In the embodiments illustrated in FIGS. 1A and 1B, and the embodiments described herein, the device 110 may instead be configured such that a hot or positive output received by the device 110 will always exit the device 110 at the first output 116, and such that the second output 118 will always be connected to a neutral or negative wire or path.

In this way, a hot output will be consistently provided to the electrical device 130 by a predetermined output of the device 110. When the electrical device 130 is connected to the device 110, dangerous situations in which current is provided to the electrical device 130 with the wrong polarity may be avoided. As used herein, polarity may describe the configuration of one or more hot outputs and a negative or neutral connection, or may describe the configuration of positive and negative connections. With respect to direct current power sources, polarity may refer to the "direction" of the current flow.

The embodiment illustrated in FIG. 1A shows a configuration in which the polarity output from the device 110 is the same as the input polarity. The hot output of the power source 120 is received by the second input 114, and the hot output is provided to the electrical device 130 by the second output 118. Thus, the polarity at the input of the device 110 is the same as the predetermined output polarity of the device 110. The embodiment illustrated in FIG. 1B, on the other hand, shows a configuration in which the polarity output from the device 110 is reversed as compared to input polarity. In FIG. 1B, the hot output of the power source 120 is illustrated as being received by the first input 112, but the hot output is provided to the electrical device 130 by the second output 118.

Those of skill in the art will appreciate that the device 110 can therefore be used to correct the polarity of electricity in a circuit such that a hot or positive output and a neutral or negative wire or path will always be provided in a predetermined configuration so that the hot or positive output point (or line) of the device is known. Electrical devices being connected to a power source via the device 110, therefore, will correctly receive a hot or positive out, increasing the safety of operation of the electrical device and/or decreasing the likelihood of damaging the electrical device.

Figure 2A:
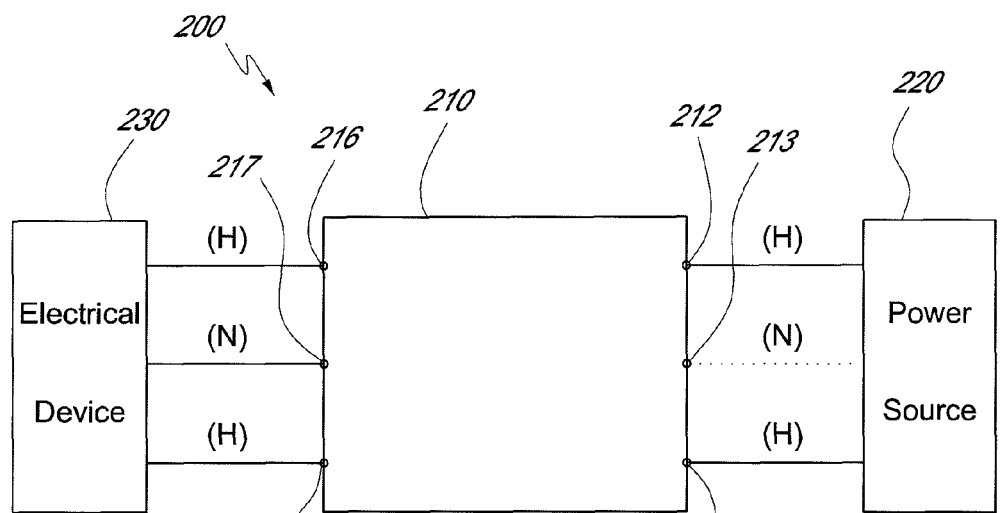
FIG. 2A is a block diagram illustrating a device, having three inputs, for correcting the polarity of electricity in a circuit, where the polarity output from the device is the same as the input polarity.
Figure 2B:
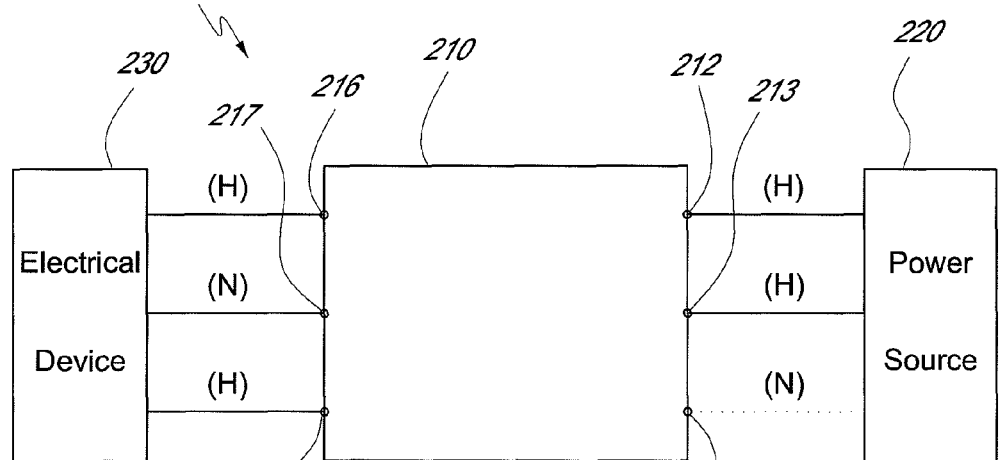
FIG. 2B is a block diagram illustrating the device of FIG. 2A, where the polarity output from the device is different than the input polarity.
Figure 2C:
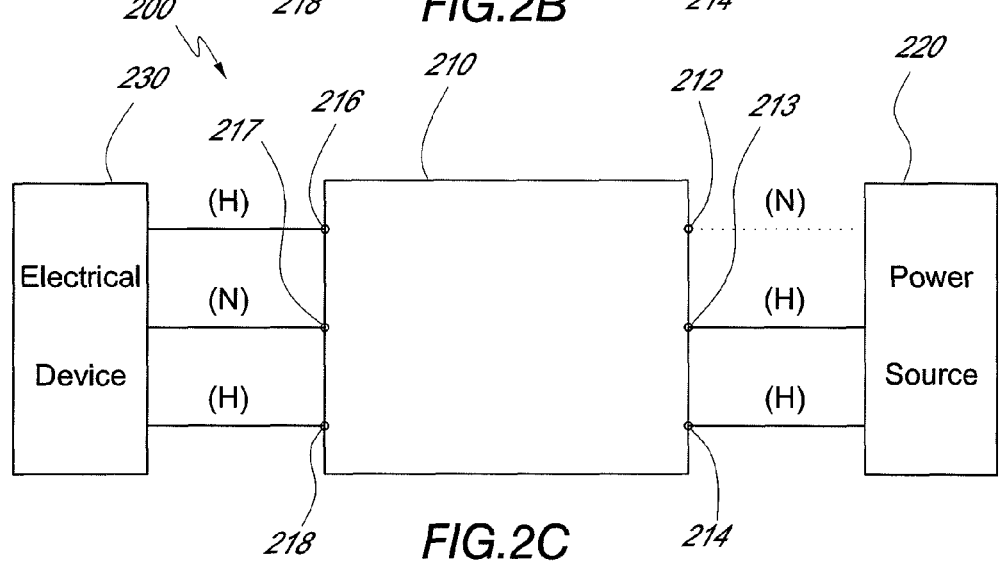
FIG. 2C is a block diagram illustrating the device of FIG. 2A, where the polarity output from the device is again different than the input polarity.

FIGS. 2A, 2B, and 2C are block diagrams illustrating a device 210 for correcting the polarity of electricity in a circuit 200. The device 210 is configured for connection to a power source 220 and an electrical device 230. The power source 220 may comprise any device configured to provide a charge, voltage, or current. In some embodiments the power source 220 comprises (or is electrically connected to) a source of alternating current, for example a generator operated by a utility company. The electrical device 230 may comprise any device that includes an element or functionality that operates using electricity, or any electrical load connected to the device 210. In contrast with the electrical device 130 illustrated in FIGS. 1A and 1B, however, the electrical device 230 is configured to receive two hot outputs from a power source. The electrical device 230 is further configured to have a neutral wire or path. In some embodiments, the electrical device 230 comprises any equipment or mechanism configured to conduct electricity or provide a circuit across the device 210. Of course, the power source 220 and/or the electrical device 230 may each comprise a plurality of devices or apparatuses.

The power source 220 may provide any number of voltages and currents to the device 210. When the power source 220 comprises a source of alternating current, a combined voltage (measured as an RMS value) supplied by the two hot outputs of the power source 220 may equal, for example, approximately 220, 360, 400, 500, 530, or 560 volts. Those of skill in the art will appreciate that voltages other than those enumerated above may be supplied by the power source 220 to the device 210. In some embodiments, the power source 220 is the same as the power source 120 described with respect to FIGS. 1A and 1B. For example, many electricity companies distribute alternating current along three separate hot power lines, where the current in each of the power lines is separated from the current in the other power lines by a predetermined phase difference. Alternating current may be provided to an electrical device, for example the electrical device 130 or 230, by selectively connecting one (as illustrated in FIGS. 1A and 1B), two (as illustrated in FIGS. 2A, 2B, and 2C), or three (not shown) of the lines to the electrical device.

As can be seen in the figures, the device 210 comprises a first input 212, a second input 213, and a third input 214. The first, second, and third inputs 212, 213, and 214 are configured to accept the voltages and currents output by the power source 220. All three inputs 212, 213, and 214 are configured to accept a hot output from the power source 220. When two of the inputs 212, 213, and 214 are connected to a hot output of the power source 220, the third input may be connected to a neutral wire or path. As described above, the neutral wire may be connected to a ground, and may pass through an electrical panel before being connected to ground. When the electrical device 230 is connected to two hot outputs and the neutral wire, power may be supplied to the electrical device 230 by the power source 220, thereby allowing the device to operate.

As can also be seen in the figures, the device 210 further comprises a first output 216, a second output 217, and a third output 218. At least two of the first, second, and third outputs 216, 217, and 218 are configured to provide a current and voltage to the electrical device 230, either directly or by way of an intermediate device or mechanism, as will be described in more detail below.

The device 210 is configured such that a current and voltage supplied by the power source 220 to two of the first, second, and third inputs 212, 213, 214, for example an alternating current as described above, will pass through the device 210 and be provided to the electrical device 230 by two of the first, second, and third outputs 216, 217, and 218. When a complete circuit is created, for example by the electrical device 230 when the electrical device 230 is powered "on," the current will return to the electrical device 210 via whichever of the first, second, and third outputs 216, 217, and 218 did not carry the current to the electrical device 230. This return current will pass through the device 210 and return to the power source 220, or to a ground as described above, via whichever of the first, second, and third inputs 212, 213, and 214 did not provide the current to the device 210 from the power source 220.

In the illustrated embodiment, the device 210 is configured such that two hot outputs received by the device 210 will always exit the device 210 at the designated first and third outputs 216 and 218. Regardless of whether the hot outputs are received at the first input 212 and the third input 214, as shown in FIG. 2A; at the first input 212 and the second input 213, as shown in FIG. 2B; or at the second input 213 and the third input 214, as shown in FIG. 3B, the hot outputs will always exit the device 210 at the first output 216 and the third output 218. Similarly, the second output 216 will always be connected to a neutral wire or path. Thus, regardless of whether the neutral wire or path is connected to the device 210 at the first input 212, the second input 213, or the third input 214, the neutral wire or path will always form a connection with the second output 216. Those of skill in the art will appreciate that the device 210 may instead be configured such that hot outputs received by the device 210 will always exit the device 210 at the first and second outputs 216 and 217, or at the second and third outputs 217 and 218. Likewise, the device 210 may be configured such that the first output 216 will always be connected to a neutral wire or path, or the device 210 may be configured such that the third output 218 will always be connected to a neutral wire or path. In other words, the configuration is such that the hot outputs will be known regardless of the input configuration.

In this way, hot outputs will be consistently provided to the electrical device 230 by predetermined outputs of the device 210. The embodiment illustrated in FIG. 2A shows a configuration in which the polarity output from the device 210 is the same as the input polarity. The hot outputs of the power source 220 are not only received by the first and third inputs 212 and 214, the hot outputs are provided to the electrical device 230 by the first and third outputs 216 and 218. Thus, the polarity at the input of the device 210 is the same as the predetermined output polarity of the device 210. The embodiment illustrated in FIG. 2B, on the other hand, shows a configuration in which the polarity output from the device 210 is different than the input polarity. In FIG. 2B, the hot outputs of the power source 220 are illustrated as being received by the first and second inputs 212 and 213, but the hot outputs are provided to the electrical device 230 by the first and third outputs 216 and 218. FIG. 2C shows another configuration in which the polarity output from the device 210 is different than the input polarity. In FIG. 2C, the hot outputs of the power source 220 are illustrated as being accepted by the second and third inputs 213 and 214, but the hot outputs are provided to the electrical device 230 by the first and third outputs 216 and 218.

Those of skill in the art will appreciate that the device 210 can therefore be used to correct the polarity of electricity in a circuit such that hot outputs and a neutral wire or path will always be provided in a predetermined configuration. Benefits of using the device 210 may be similar to the benefits of using the device 110 described with respect to FIGS. 1A and 1B, and may include increased safety. Those of skill in the art will also appreciate that although the above description discussed only alternating current, the teachings herein may in some situations apply to an embodiment in which the power source 220 provides a direct current.

Figure 3A:
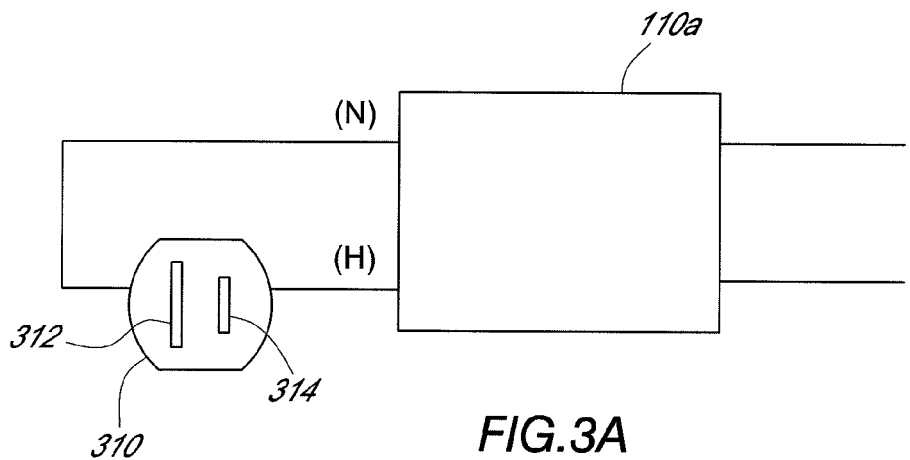
FIG. 3A is a diagram illustrating an embodiment of a device as described in FIG. 1A wired to a receptacle.
Figure 3B:
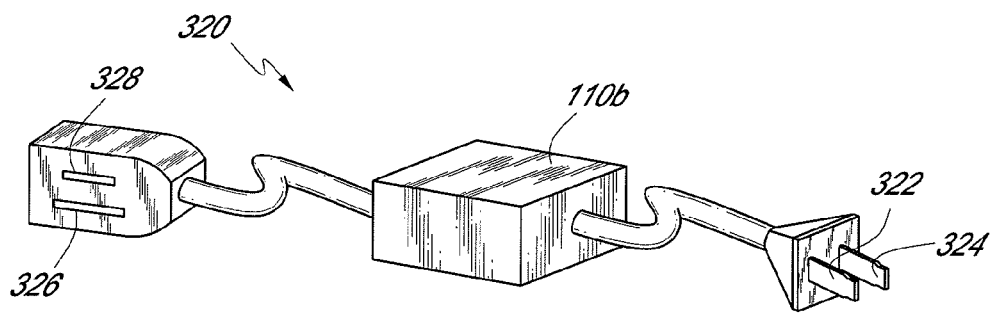
FIG. 3B is an illustration showing an embodiment of a device as described in FIG. 1A incorporated into an extension cord.
Figure 3C:
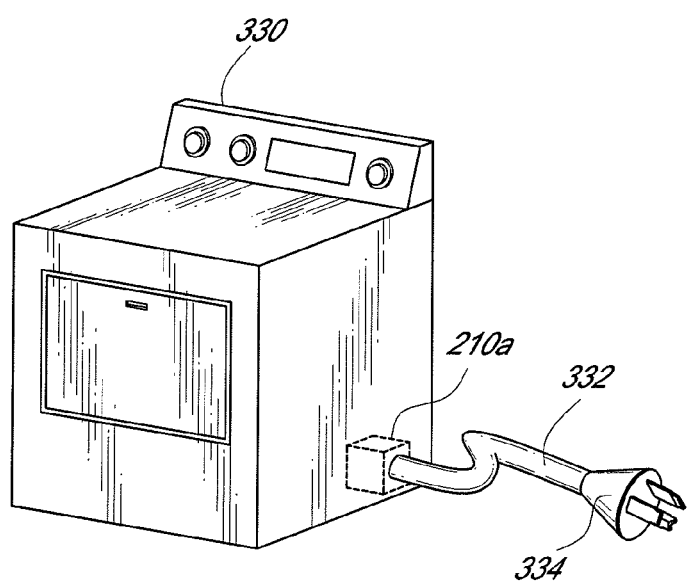
FIG. 3C is an illustration showing an embodiment of a device as described in FIG. 2A included in an electrical device.

FIGS. 3A and 3B illustrate example embodiments of how the device 110, described with respect to FIGS. 1A and 1B, may be utilized to correct the polarity of a circuit. FIG. 3C illustrates an example embodiment of how the device 210, described with respect to FIGS. 2A-2C, may be utilized to correct the polarity of electricity entering an electrical device.

FIG. 3A is a diagram illustrating a first example embodiment 110a of the device 110 wired to a receptacle 310, which receptacle 310 may for example be connected to or comprise a portion of an electrical outlet. The illustrated embodiment of the receptacle 310 includes two terminals 312 and 314, which are configured to receive the male end of an electrical plug. The plug may be attached to an electrical device and configured to carry electricity from the receptacle 310 to the electrical device when the plug is inserted into the receptacle 310.

The terminal 312, shown on the left in the illustrated embodiment, is slightly longer than the terminal 314. The prongs of many plugs are configured to match this size difference, with one prong being slightly longer. The size and shape of the terminals and prongs may decrease the likelihood of inserting the plug into the receptacle backward.

In standard receptacles, the terminal that is slightly longer is typically wired to a neutral wire or path. The slightly shorter terminal is typically wired to a hot output of a power source. This convention increases the likelihood that an electrical device plugged into the receptacle will receive electricity of the correct polarity because it is difficult to insert the plug into the receptacle backward. Thus, manufacturers of the electrical device can assume that a hot output will be received from the shorter prong of the plug.

As described above, however, it is common for receptacles and/or outlets to be wired incorrectly. Thus, an electrical device which is correctly plugged into a receptacle may still receive electricity having improper polarity. Electricity that passes through the device 110a before being received by the electrical device, however, may be corrected in polarity.

As shown in FIG. 3A, the neutral output of the device 110a is illustrated as being connected to the terminal 312. The hot output of the device 110a is shown as being connected to the terminal 314. Regardless of which input of the device 110a is provided with a hot output from a power source, the terminal 314 will be connected to the hot output. Thus, an electrical device that is plugged into the receptacle 310 can be provided with electricity of a predetermined polarity. Those of skill in the art will recognize that the device 110a could be wired to the receptacle 310 or configured such that the terminal 312 receives the hot output.

The device 110a may be provided separate from the receptacle 310 and thereafter wired to the receptacle 310. Alternatively, the receptacle 310 can be provided with the device 110a already attached. This will decrease the possibility of wiring errors. For example, an outlet including one or more receptacles having the device 110a already attached may be provided for replacing the existing outlets in a home or business. In such embodiment, the device 110a may be integrated with the structure of the outlet, or the device 110a may be a separate device that is attached to the receptacle.

FIG. 3B is an illustration showing a second example embodiment 110b of the device 110 wired into an extension cord 320. In the illustrated embodiment, the extension cord 320 includes two prongs 322 and 324 which are configured to be inserted into a receptacle of an electrical outlet. The extension cord 320 additionally includes two terminals 326 and 238, which are configured to receive the male end of an electrical plug, which may be attached to an electrical device.

The extension cord 320 is configured to carry electricity from at least one of the prongs 322 and 324 to at least one of the terminals 326 and 328, for example when the prongs 322 and 324 are plugged into an electrical outlet. The device 110b may be wired to the prongs 322 and 324 of the extension cord 320 such that the terminal 328 of the extension cord 320 will be connected to a hot output of a power source when one of the prongs 322 and 324 receives such hot output, regardless of which of the prongs 322 and 324 receives the hot output. In some embodiments, the hot output is instead connected to the terminal 326.

An electrical device that is plugged into the terminals 326 and 328 can be provided with electricity of a predetermined polarity. The operation of the extension cord 320 is similar to the operation of the device 110a wired to the receptacle 310, except that in the embodiment illustrated in FIG. 3B, the device 110b is placed between a receptacle receiving electricity from a power source and an electrical device. In the embodiment illustrated in FIG. 3A, the device 110a is placed between a power source and the receptacle 310. In either embodiment, the polarity of received electricity may be corrected and provided to an electrical device with a predetermined polarity. In alternative embodiments (not shown), the device 110b can be incorporated into a plug or receptacle portion of the extension cord 320.

FIG. 3C is an illustration showing an example embodiment 210a of the device 210 in an electrical device 330. The electrical device 330 is illustrated as being a dryer including a power cord 332 having a three prong plug 334, which plug 334 is common to many household dryers. The device 210a is connected to the power cord 332 of the device 330. In the illustrated embodiment, any electricity received through the plug 334 and the power cord 332 will first pass through the device 210a before being provided to the rest of the electrical device 330. In this way, the electrical device 330 can receive electricity with a predetermined polarity, regardless of the polarity of the electricity received at the plug 334. Those of skill in the art will recognize that the electrical device 330 is not limited to embodiments comprising a dryer, but rather may be embodied as any number of electrical devices.

In one embodiment, the device 210a is provided to a consumer separate from the electrical device 330. The device 210a may then either be installed by the consumer, or may be installed by a trained professional. In other embodiments, the device 210a is installed by the manufacturer of the electrical device 330 or by another party prior to the consumer acquiring the electrical device 330. For example, the device 210a may be installed as a type of "wire protection module" by the original equipment manufacturer (OEM) of the electrical device 330. In this embodiment, the installer can assure that the device 210a is accurately connected to the circuitry inside the electrical device 330 so as to enable proper and/or safe operation of the electrical device 330.

Figure 3D:
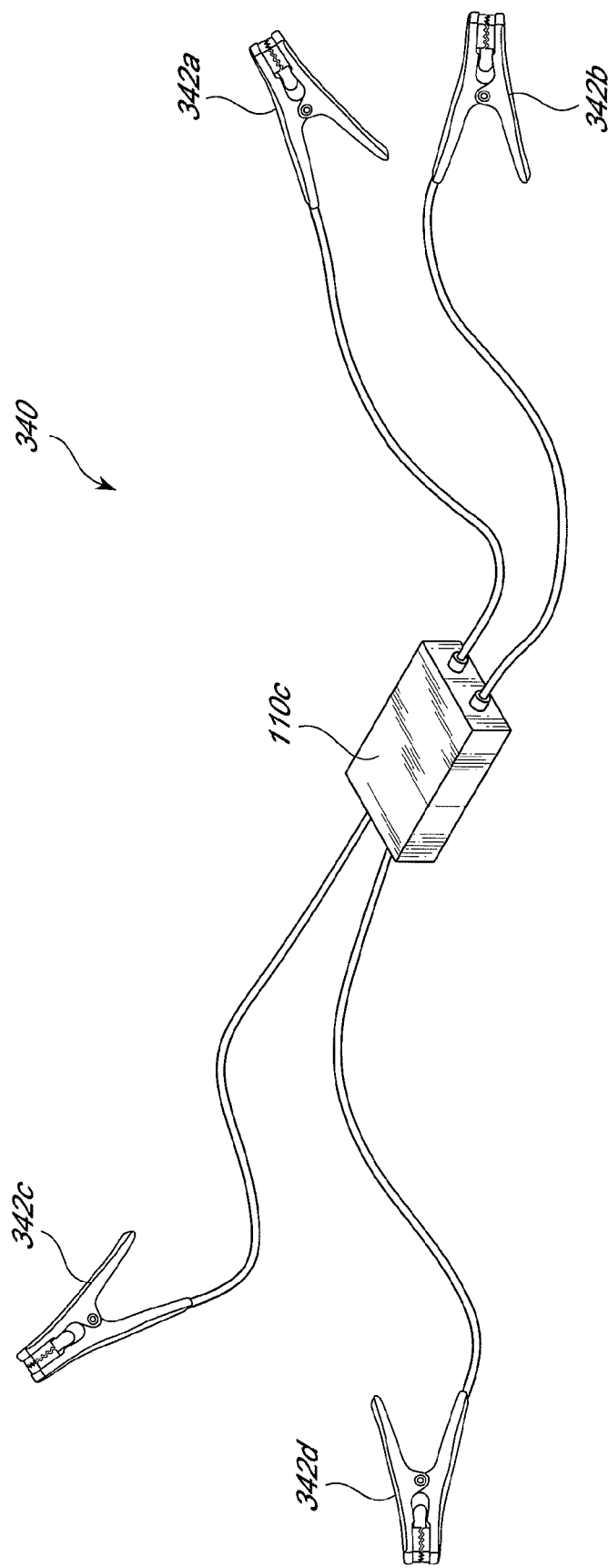
FIG. 3D is an illustration showing an embodiment of a device as described in FIG. 1A incorporated into a set of jumper cables.

FIG. 3D is an illustration showing a third example embodiment 110c of the device 110 wired into a set of jumper cables 340. The jumper cables 340 may include connectors configured for connecting to a terminal or post of a car battery. In the illustrated embodiment, the connectors comprise clamps 342a-342d. In some embodiments, one or more of the clamps 342a-342d is sized and/or shaped to connect to a metal portion of the car's body or undercarriage. The device 110c, clamps 342a-342d, or any other part of the jumper cables 340 may be marked with an indicator or instructions for a preferred method of connecting the jumper cables to two batteries.

The jumper cables 340 are configured to carry electricity from at least one of the clamps 342a-342d to at least a clamp on an opposite side of the device 110c. The device 110c may be wired to the clamps 342a-342d such that current will always flow properly from a charged battery to a dead or partially charged battery when the clamps 342a-342d are connected to the two batteries. For example, when the clamp 342c is connected to a positive terminal of a dead battery and the clamp 342d is electrically connected to a negative terminal (e.g., through the undercarriage or a particular grounded portion of a car wired to the dead battery), current will properly flow from a good battery regardless of how the clamps 342a and 342b are connected to the positive and negative terminals of the good battery. Thus, the dead battery can be charged, and the danger presented by improperly connected jumper cables may be decreased.

The jumper cables 340 are not limited to use with car batteries. The jumper cables 340 may be used with a battery of a truck, motorcycle, motorhome, ATV or other recreational vehicle, boat, jetski, or other watercraft, or any other type of vehicle. In some embodiments, the device 110 is incorporated into a conventional battery charger, for example for charging AA batteries. In such embodiment, regardless of which direction the AA battery is inserted into the charger, it will properly and safely charge.

Those skilled in the art will appreciate that the above example embodiments of how the device 110 and 210 may be utilized to correct the polarity of electricity being supplied to an electrical device are not exhaustive of the possible embodiments and utilizations. The devices 110 and 210 may be wired or connected in configurations other than those shown, and may be used with devices and in situations other than those shown. For example, the device 110 having two inputs may be utilized inside an electrical device, similar to how the device 210 is utilized inside the electrical device 330 in FIG. 3C. Further, the device 210 having three inputs may be utilized in combination with a receptacle of an electrical outlet or wired in an extension cord, similar to how the device 110 is utilized in FIGS. 3A and 3B. Those skilled in the art will be able to determine any number of other situations in which the device 110 and/or the device 210 may be utilized. For example, the device 110 and/or the device 210 may be used in any of a household, industrial, personal electronics, automotive, medical, gaming, and communications context, or in any number of other contexts. In one embodiment, the device 110 or the device 210 is included in a plug adapter used to convert an outlet or receptacle in one country into a form that can accept a plug of an electrical device from another country. In one embodiment, the device 110 or the device 210 is integrated into a faceplate or overlay configured to plug into or otherwise be attached to an electrical receptacle and to accept an electrical plug.

Figure 4A:
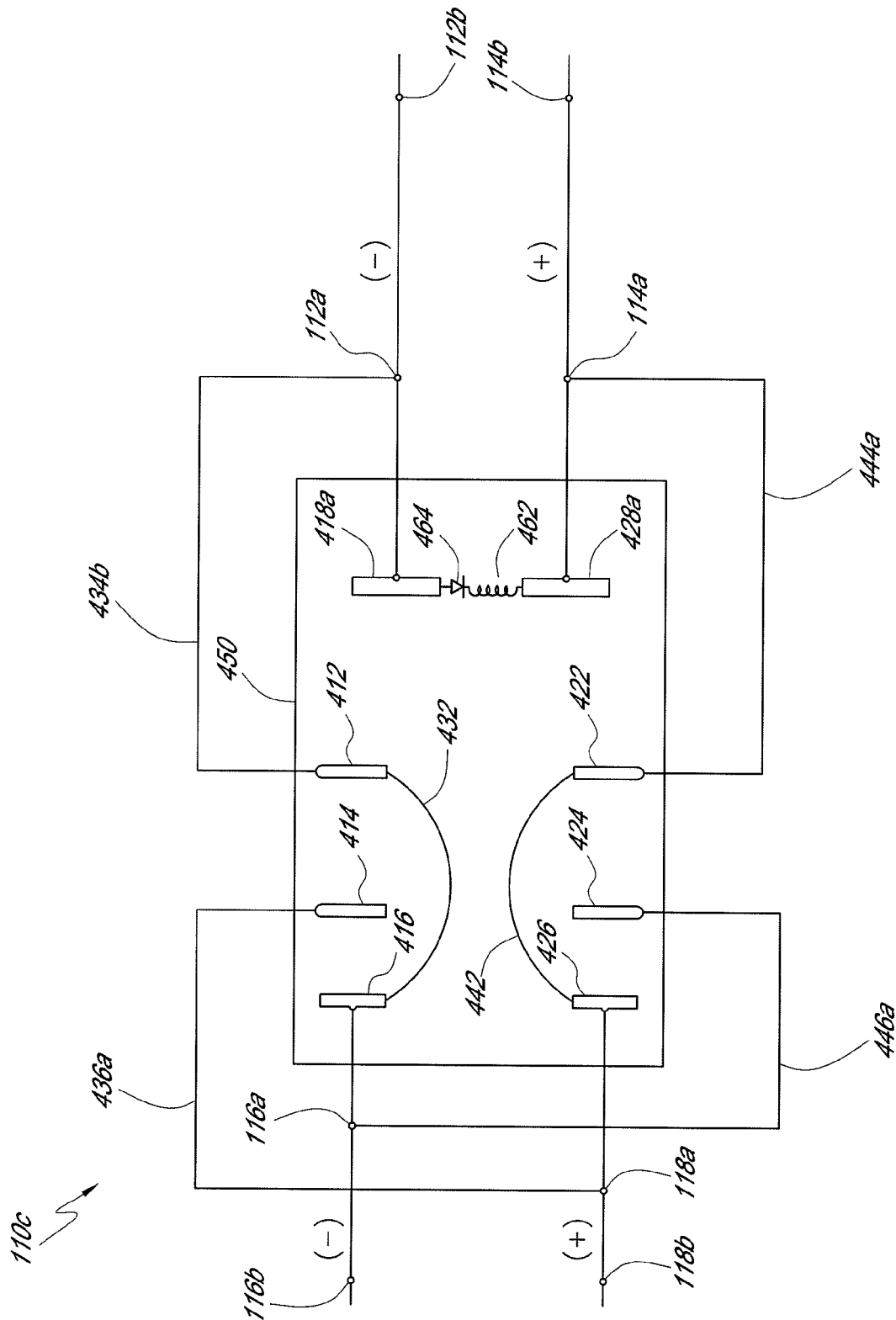
FIG. 4A is a schematic diagram illustrating an embodiment of a device as described in FIG. 1A, where the polarity output from the device is the same as the input polarity.

FIG. 4A is a schematic diagram illustrating an embodiment 110c, for example as may be used in combination with a direct current power source, of the device 110 described with respect to FIGS. 1A and 1B. In the illustrated embodiment, the polarity output from the device is illustrated as being the same as the input polarity.

The device 110c comprises common terminals 412 and 422, normally closed terminals 414 and 424, and normally open terminals 416 and 426. The terminals 412-426 may also be referred to as contacts or poles. The device 110 further comprises a first switching contact 418a, and may comprise a second switching contact 428a. The contacts 418a and 428a may also be referred to as terminals or poles. The terminals 412-426 and the switching contacts 418a and 428a may comprise any terminal, contact, post, conductor, or other element capable of carrying electric charge. In addition, the device 110c comprises connections 432, 434a, 436a, 442, 444a, and 446a. The connections 432-446a may comprise a wire, pathway, doped region, or any other element that is configured to carry a charge from a first area to a second area.

The connection 432 is connected to the common terminal 412. Additionally, the connection 432 is selectively connectable to either the normally closed terminal 416 or the normally open terminal 414. In the illustrated embodiment, the connection 432 is shown as forming a connection between the common terminal 412 and the normally closed terminal 416. In the normal state (also referred to as the "resting" or "default" state), the device 110c will have this configuration.

Figure 4B:
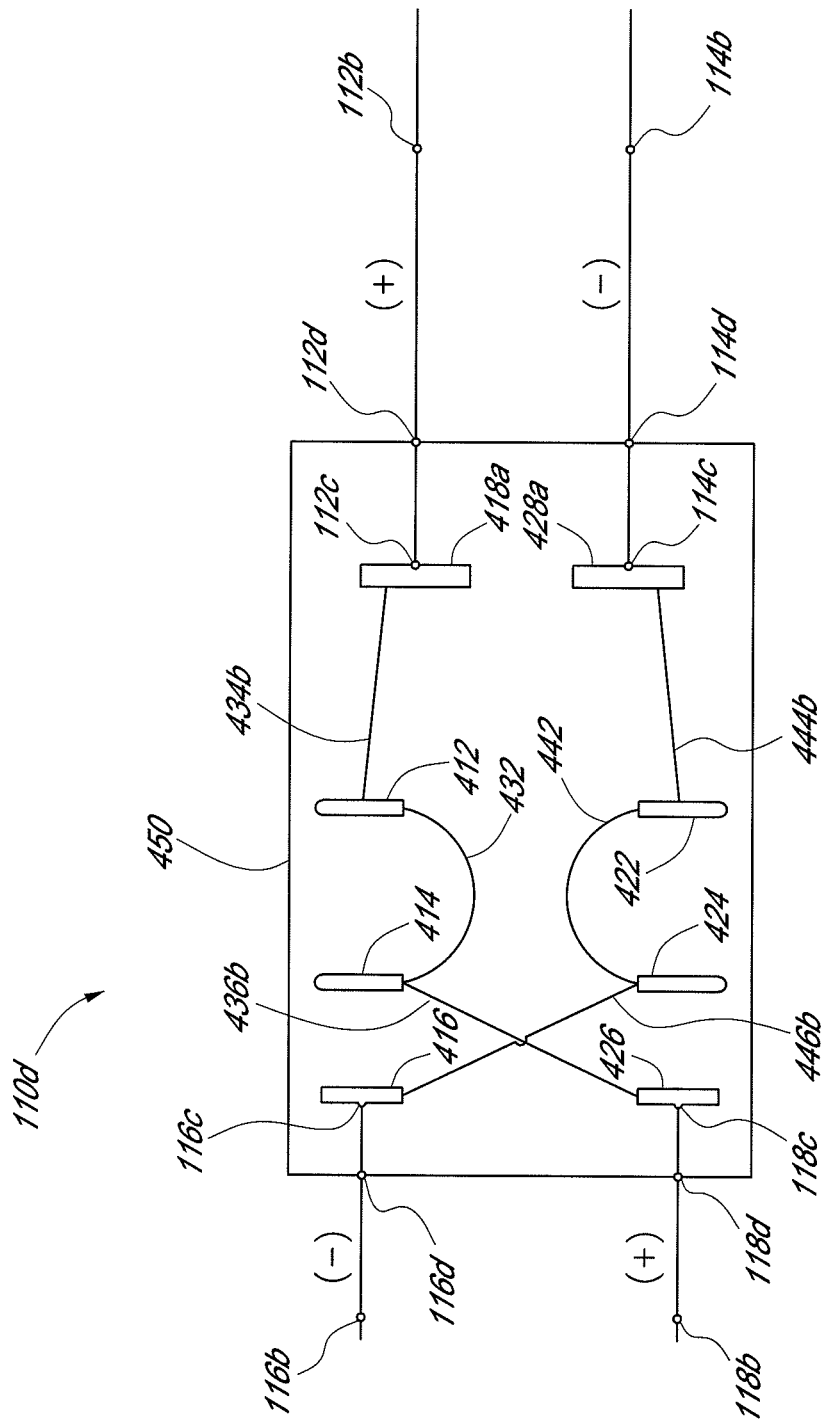
FIG. 4B is a schematic diagram illustrating an embodiment of a device as described in FIG. 1A, where the polarity output from the device is reversed as compared to the input polarity.

The device 110c is configured such that when the switching contact 418a receives a positive current exceeding a first predetermined value, the connection 432 will disconnect from the normally closed terminal 416 and connect to the normally open terminal 414, as illustrated in FIG. 4B. In this configuration, the switching contact 418a and the device 110c are considered as being "energized." Thus, when the device 110c is energized, the connection 432 will form a connection between the common terminal 412 and the normally open terminal 414.

When the current is removed from the switching contact 418a or when the current dips below a second predetermined value, and the switching contact 418a ceases to be energized, the device 110c will return to its resting state. Thus, the connection 432 will switch from being connected to the normally open terminal 414 back to being connected to the normally closed terminal 416. Thus, the connection 432 will again form a connection between the common terminal 412 and the normally closed terminal 416, as illustrated in FIG. 4A.

In the illustrated embodiment, the common terminal 418a is shown as being connected to a negative output or source. Due to the device 110c being configured such that the switching contact 48 will only energize when a positive current exceeding a first predetermined value is received, the configuration shown in FIG. 4A will not cause the switching contact to energize. Thus, the device 110c will remain in its resting state.

Those of skill in the art will understand various configurations that will enable the switching contact 418a to become energized and cease to be energized as described above. Mechanisms used to embody this configuration may comprise electrical, electronic, mechanical, and/or electromechanical means or mechanisms. In one embodiment, the device 110c includes solid state technology to enable the energizing/ceasing. In another embodiment, the device 110c includes a coil, as will be described in more detail below, to implement this configuration. Those of skill in the art will additionally understand how to manipulate the mechanisms in order to adjust the first and second predetermined values. The first and second predetermined values may be selected to coincide with a particular application, for example in order to be used with a power supply having a specific voltage or current, or to be used with a specific electronic device. In some embodiments, the first and second predetermined values are approximately similar. In other embodiments, the first and second predetermined values differ, possibly significantly.

Those of skill in the art will additionally understand various mechanisms that will enable the connection 432 to be selectively connected to the normally closed terminal 416 or the normally open terminal 414. Mechanisms used to embody this configuration may comprise electrical, electronic, mechanical, and/or electromechanical means or mechanisms. In one embodiment, the device 110c includes an armature that is movable when placed in an electromagnetic field, as will be described in more detail below.

The connection 442 is connected to the common terminal 422. Additionally, the connection 442 is selectively connectable to either the normally closed terminal 426 or the normally open terminal 424. In the illustrated embodiment, the connection 442 is shown as forming a connection between the common terminal 422 and the normally closed terminal 426. In the normal, or resting or default state, the device 110c will have this configuration.

Similar to operation of the connection 432, the connection 442 will disconnect from the normally closed terminal 426 and connect to the normally open terminal 424, as illustrated in FIG. 4B, when the switching contact 418a is energized. In this configuration, the connection 432 will form a connection between the common terminal 412 and the normally open terminal 414. Thus, energizing the device 110c will cause the connections 432 and 442 to switch from being connected from respective normally closed terminals to being connected to respective normally open terminals.

Those of skill in the art will understand various mechanisms that will enable the connection 442 to be selectively connected to the normally closed terminal 426 or the normally open terminal 424. As referenced above, the device 110c includes in one embodiment an armature that is movable when placed in an electromagnetic field.

In the illustrated embodiment, the device 110c is shown as comprising the switching contact 428a. As shown, both the switching contacts 418a and 428a are connected together and are both connectable to a power source such that a current flowing to one of the switching contacts 418a and 428a may be carried through the device 110c and flow out of the other one of the switching contacts 418a and 428a. In the illustrated embodiment, the switching contacts 418a and 428a are connected by a coil 462. When a current flows through the coil 462, an electromagnetic field will be generated. This electromagnetic field may pull the connections 432 and 442 towards it such that the connections 432 and 442 disconnect from the normally closed terminals 416 and 426, respectively, and connect to the normally open terminals 414 and 424, respectively. The coil 462 or another connection between the switching contacts 418a and 428a may be configured to generally define the first and second predetermined values.

As described above, the switching contact 418a is configured to energize only when receiving a positive current. In the illustrated embodiment, this configuration is implemented using a diode 464 in connection with the coil 462. As can be seen in FIG. 4A, the diode 464 is illustrated in the current embodiment as being in series connection with the coil 462 between the switching contacts 418a and 428a. A diode placed in this configuration will limit the direction of current flow such that current will only be able to flow from the switching contact 418a towards the switching contact 428a (using conventional notation). Thus, when a positive current is received at the switching contact 428a, as shown in FIG. 4A, current will not flow to the switching contact 418a and an electromagnetic field will not be generated in the coil 462. Therefore, the device 110c will remain in (or be return to) a resting state, as illustrated. Those of skill in the art will recognize other devices that may be used to limit current flow between the switching contacts 418a and 428a or that may be used to cause the switching contact 418a to energize only when receiving a positive voltage of a first predetermined value. For example, a magnetized armature will not be attracted to an electromagnetic field created by current flowing in certain directions.

As described with respect to FIGS. 1A and 1B, the device 110c comprises inputs 112 and 114. The input 112 may be defined at a location where the connection 434a connects to an output of a power source, for example as shown at location 112a, or may be defined at a location remote from where the connection 434a connects to the output, as shown at location 112b. Similarly, the input 114 may be defined at a location where the connection 444a connects to an output of a power source, for example as shown at location 114a, or may be defined at a location remote from where the connection 444a connects to the output, as shown at location 114b. The inputs 112 and 114 may be any terminal, contact, post, conductor, or other element capable of carrying electric charge and being configured as described above with respect to FIGS. 1A and 1B. In one embodiment, the device 110c including all of the elements illustrated in FIG. 4A is enclosed, and the inputs 112 and 114 are defined on an exterior of the enclosure and are connectable to a power source.

Also as described with respect to FIGS. 1A and 1B, the device 110c comprises outputs 116 and 118. The output 116 may be defined at a location where the connection 436a is connectable to an electrical device or intermediate device between the device 110c and the electrical device, for example as shown at location 116a. The output 116a may instead be defined at a location remote from where the connection 436a is connectable to the electrical device, as shown at location 116b. Similarly, the output 118 may be defined at a location where the connection 446a is connectable to an electrical device or intermediate device between the device 110c and the electrical device, for example as shown at location 118a. The output 118 may instead be defined at a location remote from where the connection 446a is connectable to the electrical device, as shown at location 118b. The outputs 116 and 118 may be any terminal, contact, post, conductor, or other element capable of carrying electric charge and being configured as described above with respect to FIGS. 1A and 1B. In one embodiment, the device 110c including all of the elements illustrated in FIG. 4A is enclosed, and the outputs 116 and 118 are defined on an exterior of the enclosure and are connectable to an electrical device or intermediate device or structure.

As illustrated in FIG. 4A, the connections 434a, 436a, 444a, and 446a are continually or persistently connected. Thus, current will always be carried in the connections 434a, 436a, 444a, and 446a along a predetermined path. The path will not change over time, as might the path defined by the selective connections 432 and 442.

The connection 434a forms a connection between the common terminal 412 and the switching contact 418a, and may further be connected to the input 112, as described above. The connection 436a forms a connection between the normally open terminal 414 and the normally closed terminal 426, and may further be connected to the output 118, as described above. The connection 444a forms a connection between the common terminal 422 and the input 114, and may further be connected to the switching contact 428a. The connection 446a forms a connection between the normally open terminal 424 and the normally closed terminal 416, and may further be connected to the output 116. Thus, it can be seen that each normally closed terminal 416 and 426 is connected to an opposing normally open terminal 424 and 414, respectively, and vice versa.

In the illustrated embodiment of FIG. 4A, the connections 434a, 436a, 444a, and 446a are shown as being formed outside a structure or body 450 of the device 110c. Thus, the connections 434a, 436a, 444a, and 446a may be external wires or other connections that are formed external to at least a portion of the device 110c, and that may connect various terminals, contacts, inputs, and outputs. In other embodiments, one or more of the connections 434a, 436a, 444a, and 446a are formed completely inside the device 110c.

A positive current received at the input 114 of the device 110c, for example from a direct current power source, will flow through the connection 444a to the common terminal 422. After traveling through the connection 442 to the normally closed terminal 426, the current will exit the device 110c at the output 118. When the outputs 118 and 116 are connected to an electrical device to form a complete circuit, the current will flow through the electrical device from the output 118 to the output 116. Returning to the device 110c at the output 116, the currently will flow from the normally closed terminal 416 to the common terminal 412 through the connection 432. The current will then flow through the connection 434a to the input 112 to return to the power source.

Still referring to FIG. 4A and based on the above description, it can be seen that a positive current received from a power source at the input 114 of the device 110c will be provided to an electrical device at the output 118. The current will return to the device 110c at the output 116 and will be returned to the power source from input 112. Thus, the polarity output by the electrical device 110c is the same as the input polarity.

In one embodiment, the device 110, for example as embodied in the device 110c, comprises a double pole double throw relay. In other embodiments, the device 110 comprises a different type of switch or relay. Those of skill in the art will appreciate that the device 110 may comprise any device, mechanism, or combination of devices and/or mechanisms configured as described above.

Further, those of skill in the art will appreciate that the device 110 may be implemented using any number of elements that cause a positive input current to be output at a consistent output of the device 110. The device 110 is not limited to a relay as described above, but may comprise any component configured to communicate a positive input current to the same output, regardless of which input terminal the current was received at. For example, the device 110 may comprise any type of switch for selectively connecting the positive output to one of the inputs. Further, the device is not limited to including a coil, as described above. The device 110 may comprise any number of components for detecting when a current is present and determining a configuration for connecting an input terminal to an output terminal. For example, the device 110 may comprise a controller that evaluates whether an input signal is received and selectively connects the signal to an output. In some examples, a current detector outputs a signal that causes the device 110 to output a received current at the correct output terminal.

FIG. 4B is a schematic diagram illustrating an embodiment 110d, for example as may be used in combination with a direct current power source, of the device 110 described with respect to FIGS. 1A and 1B. In the illustrated embodiment, the polarity output from the device 110d is illustrated as being the opposite of the input polarity.

The device 110d is similar to the device 110c, except that the device 110d is illustrated as having connections 434b, 436b, 444b, and 446b instead of the connections 434a, 436a, 444a, and 446a. In the illustrated embodiment, the connections 434b, 436b, 444b, and 446b are shown as being located within the bounds of the structure or body 450 of the device 110d. As shown, the connections 434a, 436a, 444a, and 446a thus may be implemented internal to the device 110d. In other embodiments, the device 110 comprises a combination of internal and external connections.

The connection 434b forms a persistent connection between the common terminal 412 and the switching contact 418a. When a current is received at the switching contact 418a from a power source, at least a portion of the current will be carried through the connection 434b to the common terminal 412 when a circuit is formed. Similarly, when a current is received at the switching contact 418a from over the connection 434b, at least a portion of the current will be returned to a power source connected to the switching terminal 418a when a circuit is formed. The connection 436a forms a persistent connection between the normally open terminal 414 and the normally closed terminal 426. The connection 444b forms a persistent connection between the common terminal 422 and the switching contact 428a. When a current is received at the switching contact 428a from a power source, at least a portion of the current will be carried through the connection 444b to the common terminal 422 when a circuit is formed. Similarly, when a current is received at the switching contact 428a from over the connection 444b, at least a portion of the current will be returned to a power source connected to the switching terminal 428a when a circuit is formed. The connection 446b forms a persistent connection between the normally open terminal 424 and the normally closed terminal 416.

In addition to the differences noted above, the illustrated embodiment of the device 110d in FIG. 4B shows that the input 112 may be defined at the switching contact 418a, for example as shown at location 112c. The input 112 may also or instead be defined at an extremity of the structure or body 450, for example as shown at location 112d. Similarly, the input 114 may be defined at the switching contact 428a, for example as shown at location 114c, or may be defined at an extremity of the structure or body 450, for example as shown at location 114d.

Further to the above differences, the illustrated embodiment of the device 110d shows that the output 114 may be defined at the normally closed terminal 416, for example as shown at location 116c. The output 116 may also or instead be defined at an extremity of the structure or body 450, for example as shown at location 116d. Similarly, the output 118 may be defined at the normally closed terminal 426, for example as shown at location 118c, or may be defined at an extremity of the structure or body 450, for example as shown at location 118d. The device 110d may otherwise be configured similar to the device 110c.

As described above, the switching contact 418a is configured to energize when receiving a positive current of at least a first predetermined value. As shown in FIG. 4B, when such positive current is received at switching contact 418a, the connections 432 and 442 will disconnect from the normally closed terminals 416 and 426, respectively, and will connect to the normally open terminals 414 and 424, respectively. Thus, the device 110d is shown in an energized state, where connections are formed between the common terminal 412 and the normally open terminal 414, and between the common terminal 422 and the normally open terminal 424.

A positive current of sufficient magnitude received at the input 112 of the device 110d, for example from a direct current power source, will cause the device 110d to energize as described above. At least a portion of the current will flow through the connection 434b to the common terminal 412. After traveling through the connection 432 to the normally open terminal 414, the current will flow to the normally closed terminal 426 through the connection 446b, and will then exit the device 110d at the output 118. When the outputs 118 and 116 are connected to an electrical device to form a complete circuit, the current will flow through the electrical device from the output 118 to the output 116. Returning to the device 110d at the output 116, the currently will flow from the normally closed terminal 416 to the normally open terminal 424 through the connection 436b. The current will then travel to the common terminal 422 through the connection 442, and will flow through the connection 44b to the input 114 to return to the power source.

Based on the above description, it can be seen that a positive current of a first predetermined value received from a power source at the input 112 of the device 110d will be provided to an electrical device at the output 118. The current will return to the device 110d at the output 116 and will be returned to the power source from input 114. Thus, the polarity output by the electrical device 110d is reversed as compared to the input polarity.

Those of skill in the art will recognize that although the above embodiments of the device 110c and 110d were described in the context of a direct current power source and as receiving a positive and negative current, certain embodiments may also be used with an alternating current source having a hot output and a neutral wire or path. Those of skill in the art will further recognize that throughout this specification, a hot output may also be used to represent a positive output in certain embodiments, and vice versa. Similarly, those of skill in the art will recognize that throughout this specification, a neutral wire or path may also be used to represent a negative output in certain embodiments, and vice versa.

Figure 5A:
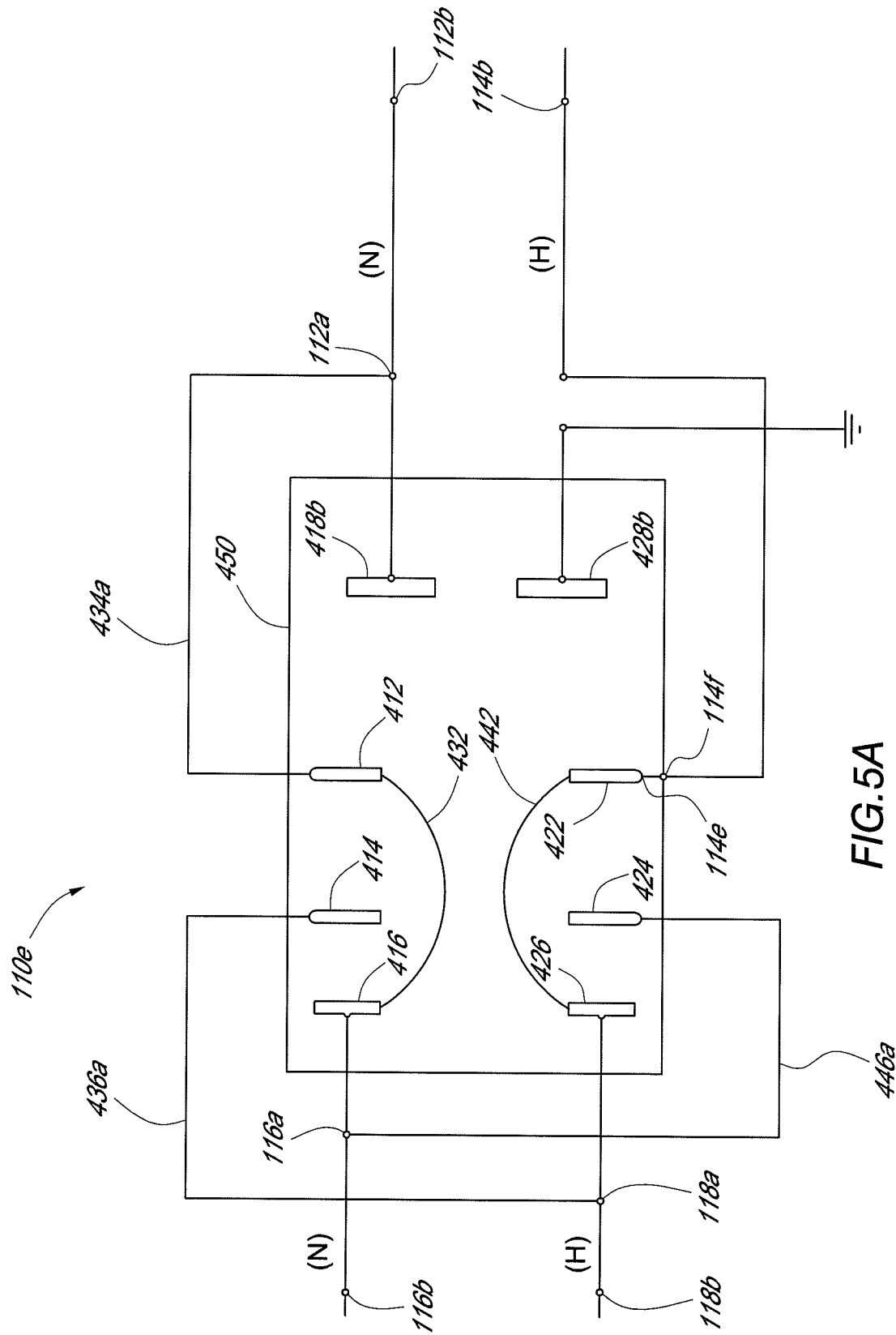
FIG. 5A is a schematic diagram illustrating an embodiment of a device as described in FIG. 1A, where the polarity output from the device is the same as the input polarity.
Figure 5B:
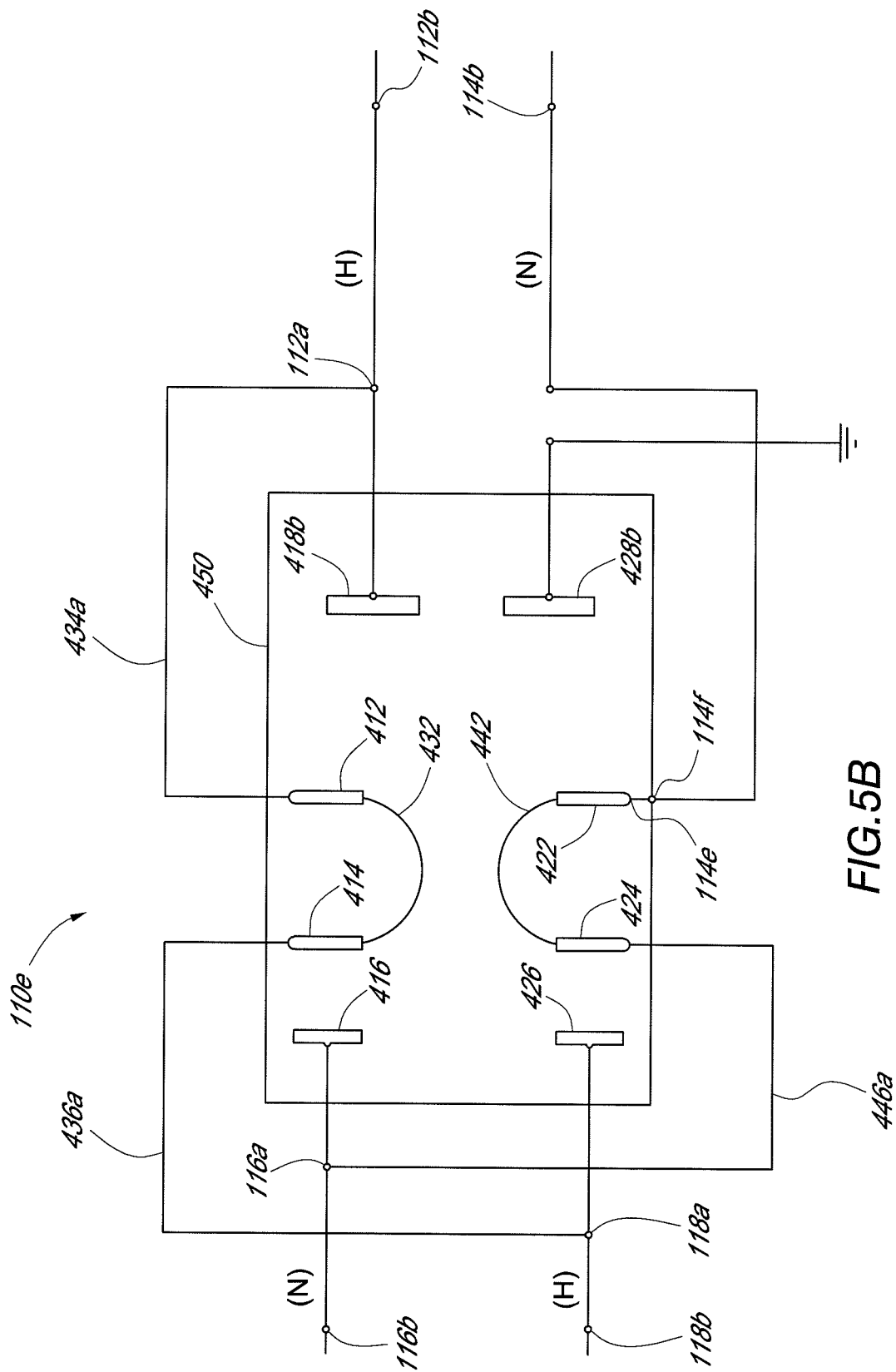
FIG. 5B is a schematic diagram illustrating an embodiment of a device as described in FIG. 1A, where the polarity output from the device is reversed as compared to the input polarity.

FIGS. 5A and 5B are schematic diagrams illustrating an embodiment 110e, for example as may be used in combination with an alternating current power source, of the device 110 described with respect to FIGS. 1A and 1B. FIG. 5A illustrates a situation in which the polarity output from the device 110e is the same as the input polarity. FIG. 5B illustrates a situation in which the polarity output from the device 110e is the opposite of the input polarity.

The device 110e illustrated in FIG. 5A is generally similar to the device 110c, except that a switching contact 428b is connected to a ground. The ground connection may be distinguishable from either of the inputs 112 and 114 such that a user wiring the device 110e can easily identify and properly wire the ground connection. Alternatively, the device 110e may be provided to a user with the ground connection already wired. For example, the device 110e may be provided attached an electrical outlet having a receptacle, as discussed with respect to FIG. 3A. In this embodiment, the switching contact 428b may be connected to a casing or metal screw threading of the outlet to provide a ground connection. Those of skill in the art will recognize other configurations in which the switching contact 428b may be wired to ground.

Further, the common contact 422 may be connected to a power source or a neutral wire or path. The device 110e may be configured such that a switching contact 418b will energize when current flowing in any direction is received. For example, a coil may be connected between the switching contact 418b and the switching contact 428b. When current flows in either direction through the coil, an electromagnetic field may be generated. In this embodiment, a mechanism for maintaining the electromagnetic field when the current falls to zero, for example as periodically occurs when transmitting alternating current, may be disposed in the device 110e. For example, a wire loop may be placed on top of the coil and configured to maintain the electromagnetic field during periods where the current does not generate the field. The switching contact 418b may also be configured such that it is only energized when receiving current in a single predetermined direction. This embodiment may also comprise a device that maintains an electromagnetic field when an alternating current is not flowing in the predetermined direction.

The illustrated embodiment of the device 110e shows that the input 114 may be defined at the common terminal 422, for example as shown at location 114e. The input 114 may also or instead be defined at an extremity of the structure or body 450, for example as shown at location 114f. The device 110e may otherwise be configured similar to the device 110c.

In the illustrated embodiment, the device 110e will become energized only when a current exceeding a first predetermined value is received at the switching contact 418b. As described above, however, neutral outputs or connections generally do not carry a current from a power source. Instead, the hot output carries the current from the power source. Thus, when the device 110e is wired in the configuration shown in FIG. 5A with the neutral wire or path being connected to the switching contact 418b, the device will not become energized and will remain in the configuration shown. In this configuration, the connections 432 and 442 form a path between the common terminal 412 and the normally closed terminal 416, and between the common terminal 422 and the normally closed terminal 426.

In the embodiment illustrated in FIG. 5A, a hot output from a power source is received from the input 114 at the common terminal 422. Current is carried between the common terminal 422 and the normally closed terminal 426 by the connection 442. An electrical device connected directly or indirectly to the output 118 will receive the hot output from the normally closed terminal 426. A neutral wire or path is connected to the common terminal 412 by the input 112. The connection 432 between the common terminal 412 and the normally closed terminal 416 forms a path for the neutral return received from the electrical device at the normally closed terminal 416 from the output 116.

When the device 110e is wired in the configuration shown in FIG. 5B, on the other hand, the hot output from the power source will be connected to the switching contact 418b and the device will become energized when the current received from the power source is more than the predetermined value. As shown in FIG. 5B, energizing the device 110e will cause the connections 432 and 442 to form a path between the common terminal 412 and the normally open terminal 414, and between the common terminal 422 and the normally open terminal 424, respectively.

In the embodiment illustrated in FIG. 5B, the hot output is received from the input 112 at the common terminal 412. Current is carried between the common terminal 412 and the normally open terminal 414 over the connection 432. Current is further carried between the normally open terminal 414 and the output 118 over the connection 436a, and an electrical device connected directly or indirectly to the output 118 will receive the hot output. A neutral wire or path is connected to the common terminal 422 by the input 114. The connection 442 between the common terminal 422 and the normally open terminal 424 forms a path for the neutral return received from the electrical device at the normally open terminal 424 from the output 116, which neutral return follows a path created by the connection 446.

Based on the above description, it can be seen that a hot output received from a power source at the input 114 of the device 110e will be provided to an electrical device at the output 118. A neutral wire or path connected to the device 110e at the input 112 will be connected to a neutral return of the electrical device connected to the device 110e at the output 116. Thus, the polarity output by the electrical device 110e will be the same as the input polarity, as shown in FIG. 5A.

Further, it can be seen that a hot output having at least a first predetermined value and being received from a power source at the input 112 of the device 110de will be provided to an electrical device at the output 118. A neutral wire or path connected to the device 110e at the input 114 will be connected to a neutral return of the electrical device connected to the device 110e at the output 116. Thus, the polarity output by the electrical device 110e will be reversed as compared to the input polarity, as shown in FIG. 5B.

Figure 6A:
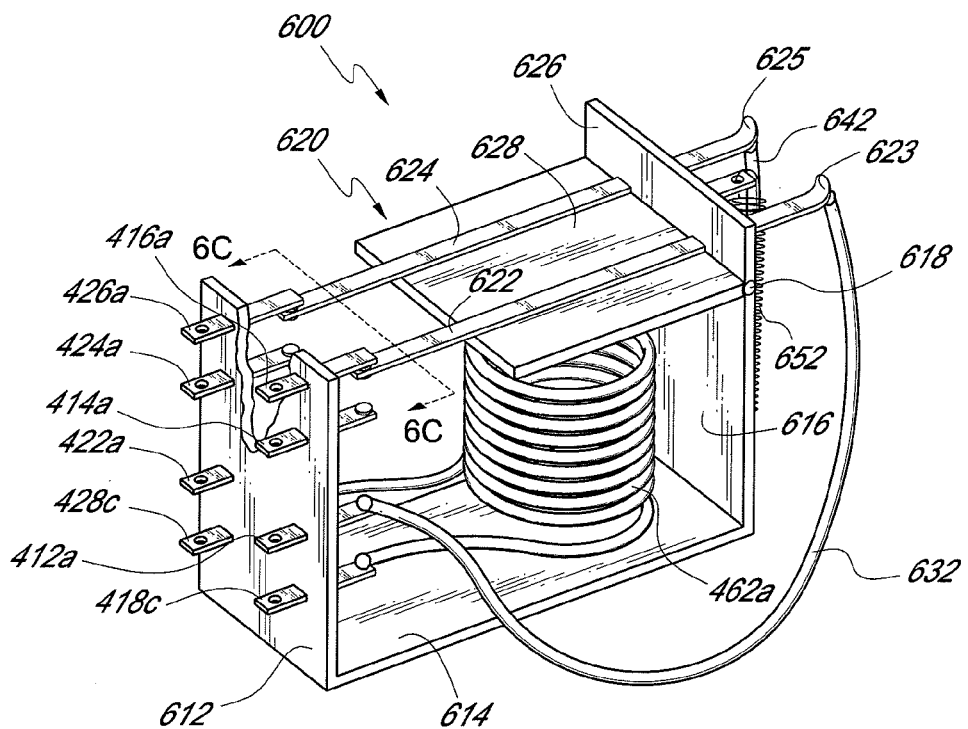
FIG. 6A is a perspective view of an embodiment of a device that may be used to implement the embodiments described in FIGS. 4A-5B, and shows the device in a default state.
Figure 6B:
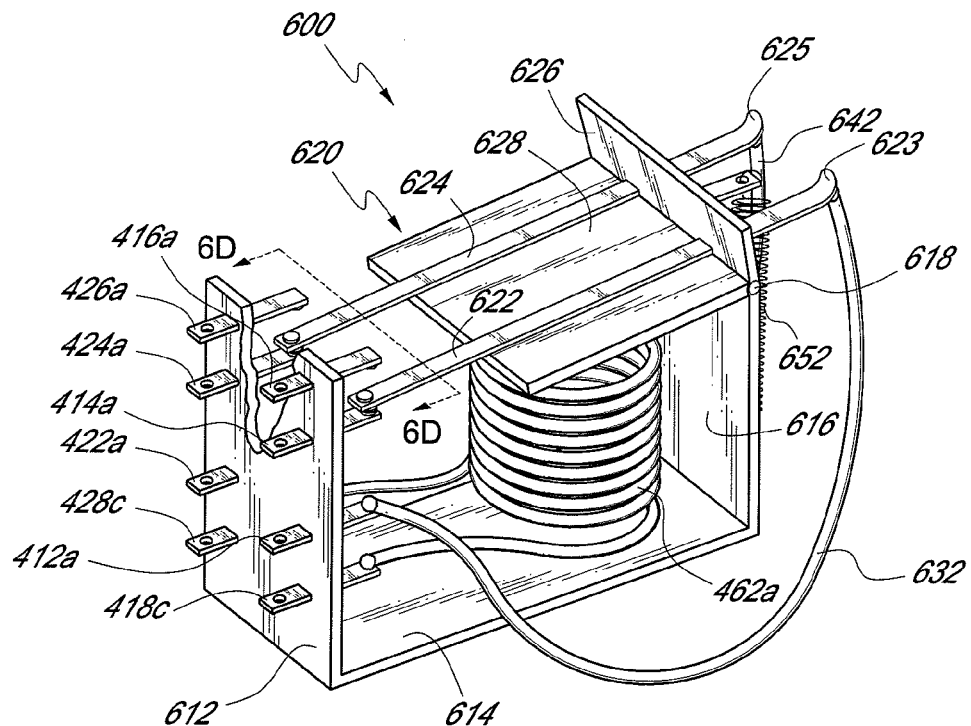
FIG. 6B is another perspective view of the embodiment of the device as illustrated in FIG. 6A, and shows the device in an energized state.

FIG. 6A is a perspective view of an embodiment of a device 600 that may be used to implement the embodiments of the devices 101c, 101d, and 101e described with respect to FIGS. 4A-5B, and shows the device 600 in a default state. FIG. 6B is another perspective view of the embodiment of the device 600 illustrated in FIG. 6A, and shows the device 600 in an energized state. For simplicity of illustration, the device 600 is shown in FIGS. 6A and 6B without the connections 434, 436, 442, and 446 that may be implemented in the devices 101c-101e.

In the embodiment illustrated in FIGS. 6A and 6B, the device 600 is shown as being a relay. As can be seen, the device 600 comprises embodiments of switching contacts 418c and 428c, common terminals 412a and 422a, normally open terminals 414a and 424a, and normally closed terminals 416a and 426a. The switching contacts 418c and 428c and the terminals 412a-426a are shown as being supported by a front wall 612. A portion of each of the switching contacts 418c and 428c and the terminals 412a-426a extends on either side of the wall, with an outer portion extending towards the viewer. In the illustrated embodiment, a cutout is shown in the front wall 612 such that an inner portion of the normally open terminal 424a and an inner portion of the normally closed terminal 426a may be illustrated in detail. The cutout may be omitted in practice. The front wall 612 may form any number of shapes and be configured in any number of sizes to support the switching contacts 418c and 428c and the terminals 412a-426a.

In the illustrated embodiment, an outer portion of the switching contacts 418a and 428a may form the inputs 112 and 114, described above. Similarly, an outer portion of the normally closed terminals 416a and 426a may form the outputs 116 and 118. Those of skill in the art will recognize that the inputs 112 and 114, and the outputs 116 and 118, may be defined or formed at other locations with respect to the device 600. In some embodiments, the device 600 is enclosed by a casing and the inputs 112 and 114, and the outputs 116 and 118, are defined at an extremity of the casing.

The device 600 additionally may comprise a lower support 614 configured to support the front wall 612, a back wall 616, and an embodiment of a coil 462a. In the illustrated embodiment, the coil 462a is connected to the switching contact 418a and the switching contact 428a. The coil 462a may be formed of a wire or other element or material capable of conducting current and formed in a helical shape. The coil 462a is configured such an electromagnetic field will be generated when current travels through the winds of the coil 462a. In some embodiments, the coil 462a is wound about a magnetic core or core that can be magnetized (not shown). For example, the coil 462a may be wrapped around a core comprising a high permeability metal such as soft iron or steel. Such core may in some embodiments increase the strength of the generated electromagnetic field. The embodiment illustrated shows the connection of the coil 462a to the switching contacts 418a and 428a, and shows other connections in the device 600, as being formed by solder balls, but those of skill in the art will recognize other means and methods of connection.

The back wall 616 supports an armature 620, which is pivotally attached to the back wall 616 by a hinged element 652. The armature 620 comprises arms 622 and 624 attached to an armature support 626 and a plate 628. A connection portion 623 and 625 of each of the arms 622 and 624, respectively, extends away from the viewer on the side of the armature support 626 opposite the viewer in the illustrated embodiment. The connection portion 623 is connected to the common terminal 412a by a wire or other conductor 632, and the connection portion 625 is connected to the common terminal 422a by a wire or other conductor 642. The back wall 616 may form any number of shapes and be configured in any number of sizes to support the armature 620.

The arm 622 is configured to contact the normally closed terminal 416a and the normally open terminal 414a, and the arm 624 is configured to contact the normally closed terminal 426a and the normally open terminal 424a. Further, the arms 622 and 624 are configured to carry an electric current, and may be formed of a metal or other material configured to carry electric current.

The plate 628 is formed of a material which can be attracted to a magnetic field. For example, the plate 628 may be formed of a soft iron. When an electromagnetic field is generated by the coil 462a, the plate 628 will be attracted to the coil 462a. Although the plate 628 is illustrated as being substantially rectangular, the plate 628 may be formed in any number of shapes. For example, the plate 628 may be circular or trapezoidal. In some embodiments, the plate 628 is omitted. For example, at least a portion of the arms 622 and 624 may be configured to be attracted to the coil 462a when an electromagnetic field is generated. The increased area of the plate 628 as compared to the area of the arms 622 and 624, however, allows the armature 620 comprising the plate 628 to be attracted to the coil 462a in a weaker electromagnetic field, which requires less current to generate. In other embodiments, a core within the coil 462a forms a solenoid configured to pull or push the armature 620 towards or away from the coil 462a.

A spring 652 is attached to the armature 620 and the back wall 616. In a resting state, as shown in FIG. 6A, the spring 652 holds the armature 620 in a position such that the arms 622 and 624 are in contact with the normally closed terminals 416a and 426a, respectively. In this configuration, current received at the common terminal 412a will travel to the connection portion 623 over the wire 632, and will continue to travel along the arm 622 until the current is received at the normally closed terminal 416a. Similarly, current received at the common terminal 422a will travel to the connection portion 625 over the wire 652, and will continue to travel along the arm 624 until the current is received at the normally closed terminal 426a.

When a current is carried through the coil 462a, an electromagnetic field will be generated as described above. If the current is sufficiently large to generate an electromagnetic field that exerts a force on the armature 620 greater than the force exerted by the spring 652, the plate 628 will be pulled toward the coil 462a and the armature 620 will pivot about the hinged element 618. While the current is maintained in the coil 462a, as shown in FIG. 6B, the generated electromagnetic field will hold the armature 620 in a position such that the arms 622 and 624 are in contact with the normally open terminals 414a and 424a, respectively. In this energized configuration, current received at the common terminal 412a will travel to the connection portion 623 over the wire 632, and will continue to travel along the arm 622 until the current is received at the normally open terminal 414a. Similarly, current received at the common terminal 422a will travel to the connection portion 625 over the wire 652, and will continue to travel along the arm 624 until the current is received at the normally open terminal 424a.

Based on the above description, it can be seen that the common terminals 412a and 422a can be selectively connected to either the normally closed terminals 416a and 426a, respectively, or the normally open terminals 414a and 424a. The coil 462a, the armature 620, and any core or other elements of the device 600 may be configured such that the current required to generate an electromagnetic field that exerts a force on the armature 620 greater than the force exerted by the spring 652 is any predetermined value. In one embodiment, the device 600 energizes when receiving an RMS voltage of approximately 110 volts or greater. Thus, the device 600 would energize when the coil 462a is connected to a common household outlet, which typically outputs an RMS voltage of approximately 120 volts. In embodiments where the device 600 is configured to receive an alternating current, the device 600 may further comprise a loop of conductive material formed on top of or above the coil 462a, which loop will maintain the electromagnetic field when current does not flow through the coil 462a.

The coil may be configured with any number of windings, and having any resistance or impedance as appropriate for a given application. The coil may be configured for household current such as 120VAC, for industrial current such as 440VAC, for automobile current such as 12VDC, or for any other number of currents. Those of skill in the art will appreciate that the device 600 may be any device enabled with the functionalities described above. Although the terms "front," "lower," and "back" are used herein, those of skill in the art will understand that these terms aren't limiting. The devices and embodiments described herein may be positioned, oriented, situated, or configured in any number of ways.

The device 600 may be configured to energize only when current is flowing in a predetermined direction. In one embodiment, the device 600 comprises a diode connected to the coil to limit the direction of current flow. In other embodiments, at least portions of the armature, for example the plate 628, are magnetized such that only an electromagnetic field in a predetermined direction will attract the armature 620. In some embodiments, a device having a coil wrapped around a pivoting armature may be employed. When current flows through the coil, magnetic poles may be created in the armature. If a contact is placed adjacent to other magnets, the armature will be repelled from the contact when the pole of the armature and the poles of the other magnets are the same. Those of skill in the art will recognize other configurations that may be used to prevent or inhibit a device from becoming energized when receiving a current in a direction other than the predetermined direction.

Figure 6C:
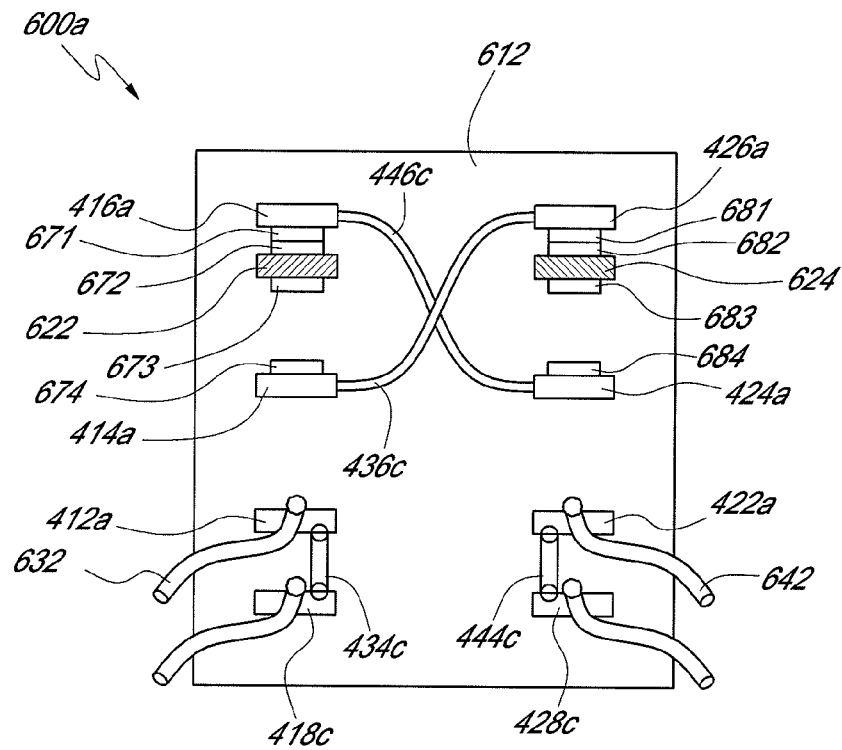
FIG. 6C is a cross-sectional view of an embodiment of the device as illustrated in FIG. 6A taken along line 6C-6C.

FIG. 6C is a cross-sectional view of an embodiment 600a of the device 600 taken along line 6C-6C of FIG. 6A. While the embodiment of the device 600 illustrated in FIG. 6A was shown without the connections without the connections 434, 436, 442, and 446 that may be implemented in the devices 101c-101e, the embodiment 600a is illustrated as having embodiments of persistent connections 434c, 436c, 442c, and 446c. The connection 434c forms a connection between the switching contact 418c and the common terminal 412a. The connection 444c forms a connection between the switching contact 428c and the common terminal 422a. The connection 436c forms a connection between the normally open terminal 414a and the normally closed terminal 426a. The connection 446c forms a connection between the normally open terminal 424a and the normally closed terminal 416a.

Similar to the configuration shown in FIG. 6A, the embodiment 600a is illustrated in FIG. 6C as being in a resting state. Thus, the arms 622 and 624 are in contact with the normally closed contacts 416a and 426a, respectively. The arms 622 and 624 may comprise contact pads 672 and 683, respectively, formed on an upper surface thereof to increase the conductivity of the connection and reduce the resistance of the connection with the normally closed terminals 416a and 426a. Similarly, the normally closed contacts 416a and 426a may comprise contact pads 671 and 681, respectively, formed on a lower surface thereof to increase the conductivity of the connection and reduce the resistance of the connection with the arms 622 and 624.

Not only is the normally closed terminal 416a connected to the normally open terminal 424a, the normally closed terminal 416a is also connected to the common terminal 412a. Current may be carried through the connection 632a to the normally closed terminal 416a, as described previously with respect to FIG. 6A. Similarly, the normally closed terminal 426a is not only connected to the normally open terminal 414a, but the normally closed terminal 426a is also connected to the common terminal 422a via the connection 642.

The connections 434c, 436c, 442c, and 446c may be formed completely inside area defined by a front wall, back wall, and lower member of the embodiment 600a. In some embodiments, the connections 434c, 436c, 442c, and 446c are formed completely inside an enclosure surrounding the embodiment 600a. In some embodiments, however, one or more of the connections 434c, 436c, 442c, and 446c are formed partially or wholly outside of an area defining a module comprising the embodiment 600a. Although the terms "upper" and "lower" are used herein, those of skill in the art will understand that these terms aren't limiting. The devices and embodiments described herein may be positioned, oriented, situated, or configured in any number of ways.

Figure 6D:
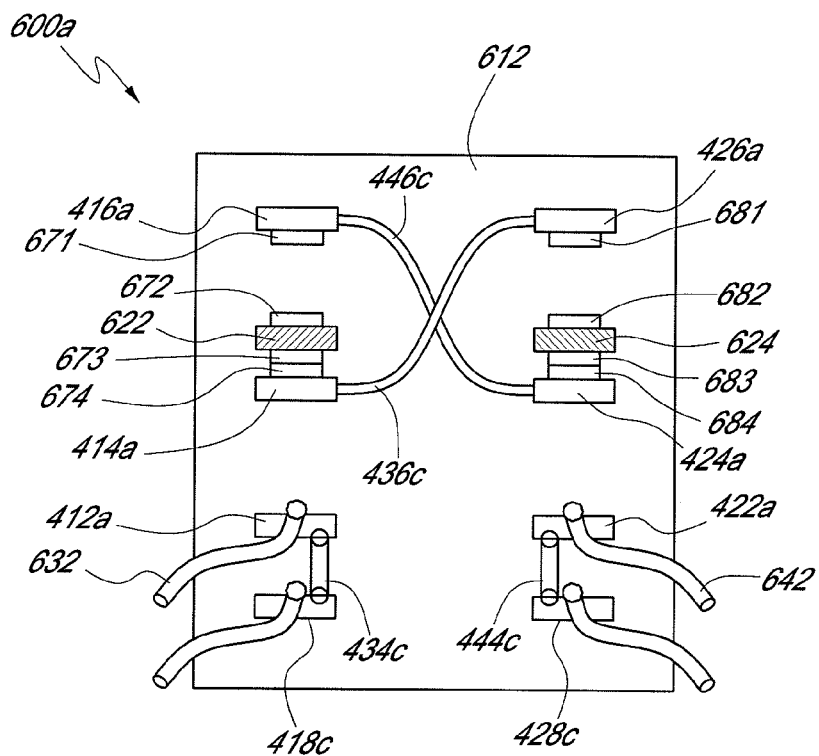
FIG. 6D is a cross-sectional view of an embodiment of the device as illustrated in FIG. 6B taken along line 6D-6D.

FIG. 6D is a cross-sectional view of the embodiment 600a taken along line 6D-6D of FIG. 6B. As described above with respect to FIG. 6A, the embodiment 600A as illustrated in FIG. 6B shows the persistent connections 434c, 436c, 442c, and 446c.

Similar to the configuration shown in FIG. 6B, the embodiment 600a is illustrated in FIG. 6D as being in an energized state. Thus, the arms 622 and 624 are in contact with the normally open contacts 414a and 424a, respectively. The arms 622 and 624 may comprise contact pads 673 and 683, respectively, formed on a lower surface thereof to increase the conductivity of the connection and reduce the resistance of the connection with the normally open terminals 414a and 424a. Similarly, the normally open contacts 414a and 424a may comprise contact pads 674 and 684, respectively, formed on an upper surface thereof to increase the conductivity of the connection and reduce the resistance of the connection with the arms 622 and 624.

Not only is the normally open terminal 414a connected to the normally closed terminal 426a, the normally open terminal 414a is also connected to the common terminal 412a. Current may be carried through the connection 632a to the normally open terminal 414a, as described previously with respect to FIG. 6A. In this configuration, current being carried to the normally open terminal 414a from the common terminal 412a may also flow to the normally closed terminal 426a. In this way, current will not be confined to a set of terminals defined by the terminals 412a, 414a, and 416a, but may cross over to the set of terminals defined by the terminals 422a, 424a, and 426a.

Similarly, the normally open terminal 424a is not only connected to the normally closed terminal 416a, but the normally open terminal 424a is also connected to the common terminal 422a via the connection 642. In this configuration, current being carried to the normally open terminal 424a from the common terminal 422a may also flow to the normally closed terminal 416a. In this way, current will not be confined to the set of terminals defined by the terminals 422a, 424a, and 426a, but may cross over to the set of terminals defined by the terminals 412a, 414a, and 416a.

Figure 7A:
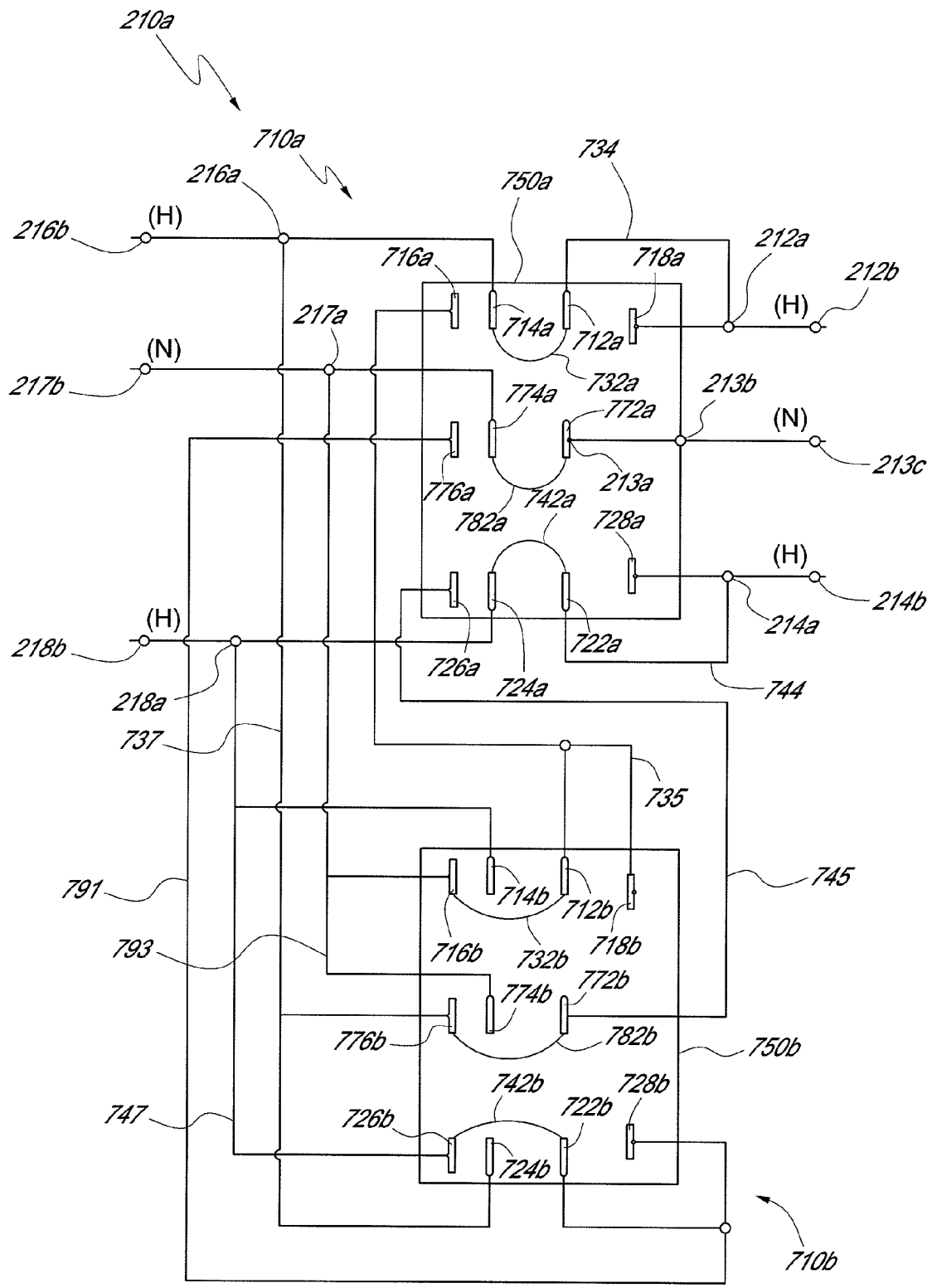
FIG. 7A is a schematic diagram illustrating an embodiment of a device as described in FIG. 2A, where the polarity output from the device is the same as the input polarity.
Figure 7B:
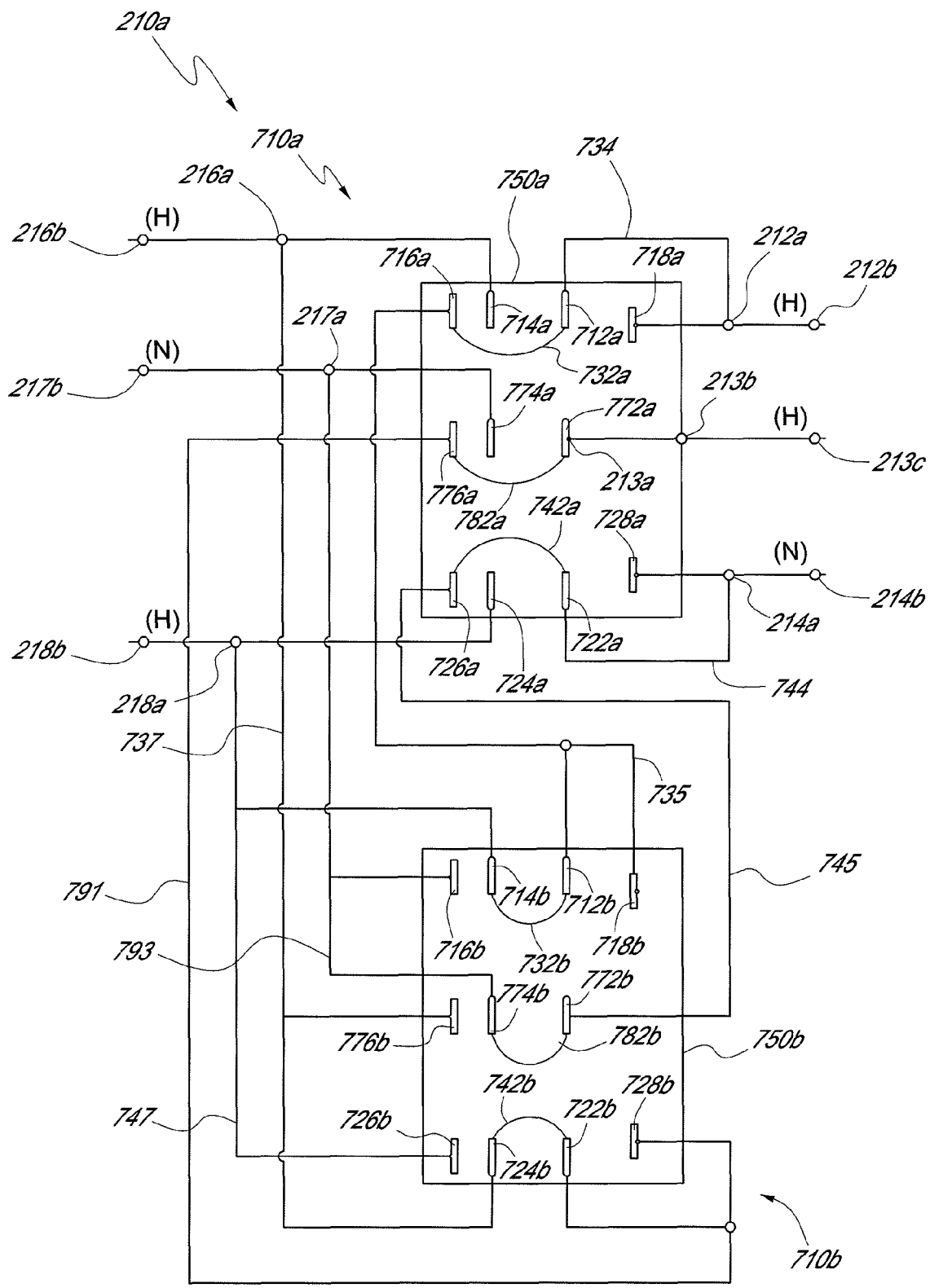
FIG. 7B is a schematic diagram illustrating the embodiment of FIG. 7A, where the polarity output from the device is different than the input polarity.
Figure 7C:
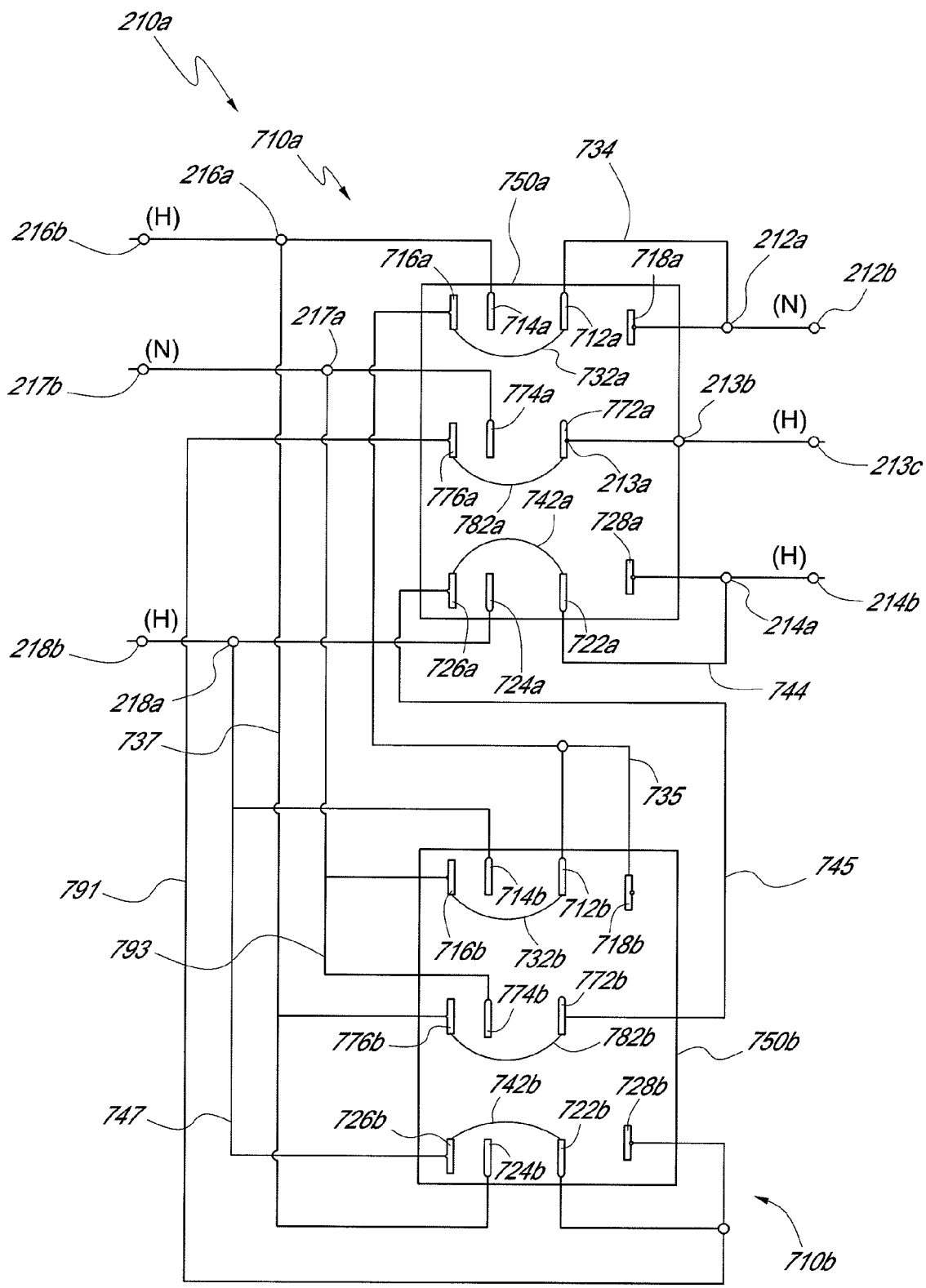
FIG. 7C is a schematic diagram illustrating the embodiment of FIG. 7A, where the polarity output from the device is again different than the input polarity.

FIGS. 7A, 7B, and 7C are schematic diagrams illustrating an embodiment 210a, for example as may be used in combination with an alternating current power source, of the device 210 described with respect to FIGS. 2A-2C. FIG. 7A illustrates a situation in which the polarity output from the embodiment 210a is the same as the input polarity. FIGS. 7B and 7C illustrate situations in which the polarity output from the embodiment 210a is different than the input polarity.

The embodiment 210a comprises a first device 710a and a second device 710b. The operation of the devices 710a and 710b feature similar selective connections and operability, but persistent connections within the device 710a and 710b and between the devices 710a and 710bs are different. The device 710a comprises common terminals 712a, 722a, and 772a; normally open terminals 714a, 724a, and 774a; and normally closed terminals 716a, 726a, and 776a. The terminals 712a-776a may also be referred to as contacts or poles. The device 710a further comprises a first switching contact 718a and a second switching contact 728a. The contacts 718a and 728a may also be referred to as terminals or poles. The terminals 712a-776a and the switching contacts 718a and 728a may comprise any terminal, contact, post, conductor, or other element capable of carrying electric charge.

In addition, the device 710a comprises connections 732a, 742a, and 782a. The connections 732a, 742a, and 782a may comprise a wire, pathway, doped region, or any other element that is configured to carry a charge from a first area to a second area. The connection 732a is connected to the common terminal 712a. Additionally, the connection 732a is selectively connectable to either the normally closed terminal 716a or the normally open terminal 714a. In the illustrated embodiment in FIG. 7A, the connection 732a is shown as forming a connection between the common terminal 712a and the normally open terminal 714a. When in this configuration, the device 710a is considered to be in an energized state.

The device 710a is configured such that it will become energized only when a current exceeding a first predetermined value is received across the switching contacts 718a and 728a. In the illustrated embodiment, the predetermined value is configured to be more than any one hot output which will be received from a power source. When two hot outputs are received substantially concurrently, however, the total current will meet or exceed the predetermined value. For example, the device 710a may be connected to an outlet having two hot terminals and a neutral terminal. Such outlets are common for providing power to electrical appliances, for example an electric clothes dryer. Such outlets are also common in businesses and industrial environments.

In the household context, each hot terminal of the outlet provides approximately 120 $V_{rms}$ (an RMS voltage of approximately 120 volts). Together, the two hot terminals provide approximately 240 $V_{rms}$. The device 710a may be configured such that it will become energized when receiving a current associated with an RMS voltage that is greater than approximately 120 volts, but less than about 240 volts. For example, the device 710a may be configured to become energized when receiving a current associated with 150 $V_{rms}$. In the embodiment illustrated in FIGS. 7A-7C, the device 710a is energized when receiving a hot output at both the switching contact 718a and at the switching contact 728a.

When the device 710a is not energized, the connection 732a will form a connection between the common contact 712a and 716a, as shown in FIG. 7B. This may be referred to as the resting, default, or normal state. When the device 710a, however, becomes energized as shown in FIG. 7A, the connection 732a will disconnect from the normally closed terminal 716a and connect to the normally open terminal 714a. Thus, when the device 710a is energized, the connection 732a will form a connection between the common terminal 712a and the normally open terminal 714a.

When a hot output is removed from one or both of the switching contacts 718a and 718b or when the combined current of the two hot outputs dips below a second predetermined value, the device 710a ceases to be energized and will return to its resting state. Thus, the connection 732a will switch from being connected to the normally open terminal 714a back to being connected to the normally closed terminal 716a. Thus, the connection 732a will again form a connection between the common terminal 712a and the normally closed terminal 716a, as illustrated in FIG. 7B.

Those of skill in the art will understand various configurations that will enable the device 710a to become energized and cease to be energized as described above. Mechanisms used to embody this configuration may comprise electrical, electronic, mechanical, and/or electromechanical means or mechanisms. In one embodiment, the device 710a includes solid state technology to enable the energizing/ceasing. In another embodiment, the device 710a includes a coil connected between the switching contacts 718a and 728a. Those of skill in the art will additionally understand how to manipulate the mechanisms in order to adjust the first and second predetermined values. The first and second predetermined values may be selected to coincide with a particular application, for example in order to be used with a power supply which provides a specific voltage or current, as may be common in a selected country, or may be selected to be used with a specific electronic device. In some embodiments, the first and second predetermined values are approximately similar. In other embodiments, the first and second predetermined values differ, possibly significantly.

The connection 742a is connected to the common terminal 722a. Additionally, the connection 742a is selectively connectable to either the normally closed terminal 726a or the normally open terminal 724a. When the device 710a is in the energized state as shown in FIG. 7A, the connection 742a forms a connection between the common terminal 722a and the normally open terminal 724a. When the device 710a, however, is in the resting state as shown in FIG. 7B, the connection 742a forms a connection between the common terminal 722a and the normally closed terminal 726a. Similar to operation of the connection 732a, the connection 742a will disconnect from the normally closed terminal 726a and connect to the normally open terminal 724a when the device 710a becomes energized.

Further, the connection 782a is connected to the common terminal 772a. Additionally, the connection 782a is selectively connectable to either the normally closed terminal 776a or the normally open terminal 774a. When the device 710a is in the energized state as shown in FIG. 7A, the connection 782a forms a connection between the common terminal 772a and the normally open terminal 774a. When the device 710a, however, is in the resting state as shown in FIG. 7B, the connection 782a forms a connection between the common terminal 772a and the normally closed terminal 776a. Similar to operation of the connections 732a and 742a, the connection 782a will disconnect from the normally closed terminal 776a and connect to the normally open terminal 774a when the device 710a becomes energized. Thus, energizing the device 710a will cause the connections 732a, 742a, and 782a to all switch from being connected from respective normally closed terminals to being connected to respective normally open terminals.

Those of skill in the art will additionally understand various mechanisms that will enable the connections 732a, 742a, and 782a to be selectively connected to the normally closed terminals 716a, 726a, and 776a, or the normally open terminals 714a, 724a, and 774a, respectively. Mechanisms used to embody this configuration may comprise electrical, electronic, mechanical, and/or electromechanical means or mechanisms. In one embodiment, the device 710a includes an armature that is movable when placed in an electromagnetic field. For example, the device 710a may comprise a relay configured similar to the device 600 described with respect to the FIGS. 6A and 6B. The armature of the relay of the device 710a, however, may comprise three arms that form selective connections in each of a respective set of terminals. In such embodiment, a coil of the relay may be configured to generally define the first and second predetermined values. In one embodiment, the device 710a comprises a triple pole, double throw relay. In other embodiments, the device 710a comprises a different type of switch or relay. Those of skill in the art will appreciate that the device 710a may comprise any device, mechanism, or combination of devices and/or mechanisms configured as described above.

The device 710b comprises common terminals 712b, 722b, and 772b; normally open terminals 714b, 724b, and 774b; normally closed terminals 716b, 726b, and 776b; and switching contacts 718b and 728b. The device 710b further comprises connections 732b, 742b, and 782b.

The device 710b is configured similar to the device 710a. In a resting state as shown in FIG. 7A, the connection 732b forms a connection between the common terminal 712b and the normally closed terminal 716b, the connection 742b forms a connection between the common terminal 722b and the normally closed terminal 726b, and the connection 782b forms a connection between the common terminal 772b and the normally closed terminal 776b.

When the device 710b becomes energized, for example by receiving two hot outputs, the connections 732b, 742b, and 782b will disconnect from the normally closed terminals 716b, 726b, and 776b, respectively, and connect to the normally open terminals 714b, 724b, and 774b, respectively. In this energized state, shown in FIG. 7B, the connection 732b forms a connection between the common terminal 712b and the normally open terminal 714b, the connection 742b forms a connection between the common terminal 722b and the normally open terminal 724b, and the connection 782b forms a connection between the common terminal 772b and the normally open terminal 774b.

The device 210a further comprises connections 734, 735, 737, 744, 745, 747, 791, and 793, which are continually or persistently connected. Thus, current will always be carried in the connections 734, 735, 737, 744, 745, 747, 791, and 793 along a predetermined path. The path will not change over time, as might the path defined by the selective connections 732a, 732b, 742a, 742b, 782a, and 782b.

The connection 734 forms a connection between the common terminal 712a and the switching contact 718a, and may further be connected to the input 212, as will be described below. The connection 735 forms a connection between the normally closed terminal 716a and the switching contact 718b, as may be further connected to the common terminal 712b. The connection 737 forms a connection between the normally open terminal 714a and the normally open terminal 724b, and may be further connected to the normally closed terminal 776b. The connection 744 forms a connection between the common terminal 722a and the input 214, as will be described later, and may further be connected to the switching contact 728a. The connection 745 forms a connection between the normally closed terminal 726a and the common terminal 772b. The connection 747 forms a connection between the normally open terminal 724a and the normally open terminal 714b, and may further be connected to the normally closed terminal 726b. The connection 791 forms a connection between the normally closed contact 776a and the common terminal 722b, and may be further connected to the switching contact 728b. The connection 793 forms a connection between the normally open terminal 774a and the normally closed terminal 716b, and may be further connected to the normally open terminal 774b.

As described with respect to FIGS. 2A-2C, the device 210a comprises inputs 212, 213, and 214. The input 212 may be defined at a location where the connection 734 connects to an output of a power source, for example as shown at location 212a, or may be defined at a location remote from where the connection 734 connects to the output, as shown at location 212b. Similarly, the input 214 may be defined at a location where the connection 744 connects to an output of a power source, for example as shown at location 714a, or may be defined at a location remote from where the connection 744 connects to the output, as shown at location 214b. The input 213 may be defined at the common terminal 772a, for example as shown at location 213a. The input 213 may also or instead be defined at an extremity of a structure or body 750 of the device 710a, for example as shown at location 213b, or may be defined at a more remote location, as shown at location 213c. The inputs 212, 213, and 214 may be any terminal, contact, post, conductor, or other element capable of carrying electric charge and being configured as described above with respect to FIGS. 2A-2C. In one embodiment, the device 210a including all of the elements illustrated in FIG. 7A is enclosed, and the inputs 212, 213, and 214 are defined on an exterior of the enclosure and are connectable to a power source.

Also as described with respect to FIGS. 2A-2C, the device 210a comprises outputs 216, 217, and 218. The output 216 may be defined at a location where the connection 737 is connectable to an electrical device or intermediate device between the device 210a and the electrical device, for example as shown at location 216a. The output 216a may instead be defined at a location remote from where the connection 737 is connectable to the electrical device, as shown at location 216b. Similarly, the output 217 may be defined at a location where the connection 793 is connectable to an electrical device or intermediate device between the device 210a and the electrical device, for example as shown at location 217a. The output 217 may instead be defined at a location remote from where the connection 793 is connectable to the electrical device, as shown at location 217b. Further, the output 218 may be defined at a location where the connection 747 is connectable to an electrical device or intermediate device between the device 210a and the electrical device, for example as shown at location 218a. The output 218 may instead be defined at a location remote from where the connection 747 is connectable to the electrical device, as shown at location 218b. The outputs 216, 217 and 218 may be any terminal, contact, post, conductor, or other element capable of carrying electric charge and being configured as described above with respect to FIGS. 2A-2C. In one embodiment, the device 210a including all of the elements illustrated in FIG. 7A is enclosed, and the outputs 216, 217, and 218 are defined on an exterior of the enclosure and are connectable to an electrical device or intermediate device or structure.

FIG. 7A shows hot outputs, for example from an alternating current power source, being received by the inputs 212 and 214 of the device 210a, and a neutral wire or path being connected to the input 213. Hot outputs received at the inputs 212 and 214 will cause the device 710a to energize as described above and as illustrated in FIG. 7A. A first hot output is connected to the common terminal 712a from the input 212 by the connection 734. The first hot output and is further connected by the connection 732a to the normally open terminal 714a, which is connected to the output 216. A second hot output is connected to the common terminal 722a from the input 214 by the connection 744. The second hot output is further connected by the connection 742a to the normally open terminal 724a, which is connected to the output 218. A neutral wire or path, on the other hand, is connected to the common terminal 772a from the input 213. The neutral path is further connected by the connection 782a to the normally open terminal 774a, which is connected to the output 217.

Based on the above description, it can be seen that when hot outputs are received from a power source at the inputs 212 and 214a and a neutral wire or path is connected to the input 213, the hot output received at the input 212 of the device 210a will be provided to an electrical device at the output 216. The hot output received at the input 214 will be provided to the electrical device at the output 218. The neutral wire or path connected to the device 210a at the input 213 will be connected to a neutral return of the electrical device connected to the device 210*a* at the output 217. Thus, the polarity output by the electrical device 210*a* will be the same as the input polarity, as shown in FIG. 7A.

FIG. 7B shows hot outputs being received from a power source by the inputs 212 and 213 of the device 210*a*, and a neutral wire or path being connected to the input 214. In this configuration, only the switching contact 718*a* will receive a hot output from the power source. The other switching contact 728*a* will receive the neutral path. Thus, the device 710*a* will remain in the resting state.

A first hot output is connected to the common terminal 712*a* from the input 212 by the connection 734. The first hot output is further connected by the connection 732*a* to the normally closed terminal 716*a*, which is connected to the switching contact 718*b* of the device 710*b* by the connection 735. Thus, the switching contact 718*b* will receive at least a portion of the first hot output.

A second hot output is connected to the common terminal 772*a* from the input 213. The hot output is further connected by the connection 782*a* to the normally closed contact 776*a*, which is connected to the switching contact 728*b* of the device 710*b* by the connection 791. Thus, the switching contact 728*b* will receive at least a portion of the first hot output. Therefore, both the switching contacts 718*b* and 728*b* will receive a hot output when the device 210*a* receives hot outputs at the inputs 212 and 213. This will cause the device 710*b* to energize as described above and as illustrated in FIG. 7B.

The first hot output is also connected to the common terminal 712*b* by the connection 735. The common terminal 712*b* is connected by the connection 732*b* to the normally open terminal 714*b*, which is connected to the output 218. In this way, the first hot output received at the input 212 will be connected to the output 218.

The second hot output is also connected to the common terminal 722*b* by the connection 791. The common terminal 722*b* is connected by the connection 742*b* to the normally open terminal 724*b*, which is connected to the output 216. In this way, the second hot output received at the input 213 will be connected to the output 216.

The neutral path is connected to the common terminal 722*a* from the input 214 by the connection 744, and is further connected to the normally closed terminal 726*a* by the connection 742*a*. The normally closed terminal 726*a* is connected to the common terminal 772*b* of the device 710*b* by the connection 745. The common terminal 772*b* is connected by the connection 782*b* to the normally open terminal 774*b*, which is connected to the output 217.

Based on the above description, it can be seen that when hot outputs are received from a power source at the inputs 212 and 213 and a neutral wire or path is connected to the input 214, the hot output received at the input 212 of the device 210*a* will be provided to an electrical device at the output 218. The hot output received at the input 213 will be provided to the electrical device at the output 216. The neutral wire or path connected to the device 210*a* at the input 214 will be connected to a neutral return of the electrical device connected to the device 210*a* at the output 217. Thus, the polarity output by the electrical device 210*a* will be different than the input polarity, as shown in FIG. 7B.

FIG. 7C shows hot outputs being received from a power source by the inputs 213 and 214 of the device 210*a*, and a neutral wire or path being connected to the input 212. In this configuration, only the switching contact 728*a* will receive a hot output from the power source. The other switching contact 718*a* will receive the neutral path. Thus, the device 710*a* will remain in the resting state.

The neutral path is connected to the common terminal 712*a* from the input 212 by the connection 734. The neutral path is further connected by the connection 732*a* to the normally closed terminal 716*a*, which is connected to the switching contact 718*b* of the device 710*b* by the connection 735. Thus, the switching contact 718*b* will be connected to the neutral wire or path.

A first hot output is connected to the common terminal 772*a* from the input 213. The hot output is further connected by the connection 782*a* to the normally closed contact 776*a*, which is connected to the switching contact 728*b* of the device 710*b* by the connection 791. Thus, the switching contact 728*b* will receive at least a portion of the first hot output. In this configuration, however, the other switching contact 718*b* will not be connected to a hot output, as described above. Therefore, the device 170*b* will remain in the resting state.

The neutral wire is also connected to the common terminal 712*b* by the connection 735. The common terminal 712*b* is connected by the connection 732*b* to the normally closed terminal 716*b*, which is connected to the output 217.

The first hot output is also connected to the common terminal 722*b* by the connection 791. The common terminal 722*b* is connected by the connection 742*b* to the normally closed terminal 726*b*, which is connected to the output 218. In this way, the first hot output received at the input 213 will be connected to the output 218.

A second hot output is connected to the common terminal 722*a* from the input 214 by the connection 744. The second hot output is further connected by the connection 742*a* to the normally closed terminal 726*a*, which is connected to the common terminal 772*b* of the device 710*b* by the connection 745. The common terminal 772*b* is connected by the connection 782*b* to the normally closed terminal 776*b*, which is connected to the output 216. In this way, the second hot output received at the input 214 will be connected to the output 216.

Based on the above description, it can be seen that when hot outputs are received from a power source at the inputs 213 and 214 and a neutral wire or path is connected to the input 212, the hot output received at the input 213 of the device 210*a* will be provided to an electrical device at the output 218. The hot output received at the input 214 will be provided to the electrical device at the output 216. The neutral wire or path connected to the device 210*a* at the input 212 will be connected to a neutral return of the electrical device connected to the device 210*a* at the output 217. Thus, the polarity output by the electrical device 210*a* will be different than the input polarity, as shown in FIG. 7C.

Those of skill in the art will understand that although the devices 710*a* and 710*b* are illustrated as being separate devices having external connections between them, the devices 710*a* and 710*b* may instead be implemented as a single device. For example, the functionality of the device 710*a* and 710*b* may be implemented on a single chip. If the devices 710*a* and 710*b* are implemented as separate devices, the devices 710*a* and 710*b* may be packaged together as a single module or device. For example, the entirety of the device 210 may be enclosed and have inputs and outputs defined for connection to a power source and electrical device. In one embodiment, each of the devices 710*a* and 710*b* comprises a double pole double throw relay. In other embodiments, one or more of the devices 710*a* and 710*b* comprise a different type of switch or relay. Those of skill in the art will appreciate that the device 210 may comprise any device, mechanism, or combination of devices and/or mechanisms configured as described above. In some embodiments, the device 210 is connected to or configured to connect to a receptacle of an electrical outlet having two hot terminals and one neutral terminal. Those of skill in the art will further understand that the location of the terminals or contacts with respect to each other may vary.

Various embodiments of a polarity correcting device have been herein described. The polarity correcting device may accept one or more hot outputs from a power source and a neutral wire or path, or a positive and negative output from a power source, and provide the one or more hot outputs to predetermined outputs of the polarity correcting device. The output of the polarity correcting device connected to the hot output of the power source will be consistent regardless of which input of the polarity correcting device receives the hot output. Such consistent connection of a hot output or outputs of a power source to a predetermined output or outputs of the polarity correcting device will increase the safety with which a user may operate an electrical device connected to the polarity correcting device. Further, such consistent connection may prolong the lifetime and usability of the connected electrical device.

Polarity correcting devices described herein may be embodied in a plurality of configurations and may have a plurality of applications. For example, the polarity correcting devices described herein and enabled by the above description may be implemented in households and businesses, or in other industrial situations. The devices may be connected to an electrical outlet, wiring within a wall or electrical device, or a power cord or adapter. The polarity correcting device may also be a standalone device, for example that may be placed between an electrical device and an outlet, and/or may indicate when the polarity of a circuit is being corrected. For example, the device may comprise one or more indicators, for example a light emitting diode (LED) or other light element, placed in one or more of the persistent connections, for example the connection 436 or 446. The device may be implemented as a cover that may be temporarily or semi-permanently placed over an electrical outlet. Those of skill in the art will appreciate other applications which have not been herein enumerated.

While the above detailed description has shown, described, and pointed out the fundamental novel features of a plurality of embodiments, it will be understood that various omissions and substitutions and changes in the form and details of the systems and devices illustrated may be made by those skilled in the art, without departing from the intent of the invention.

What is claimed is:

1. An electrical device, comprising:
   a first and a second switching contact;
   a first set of terminals comprising a first common terminal, a first normally closed terminal, and a first normally open terminal, wherein energizing the first and second switching contacts causes the first common terminal to switch from connecting to the first normally closed terminal to connecting to the first normally open terminal;
   a second set of terminals comprising a second common terminal, a second normally closed terminal, and a second normally open terminal, wherein energizing the first and second switching contacts causes the second common terminal to switch from connecting to the second normally closed terminal to connecting to the second normally open terminal;
   a third and a fourth switching contact;
   a third set of terminals comprising a third common terminal, a third normally closed terminal, and a third normally open terminal, wherein energizing the third and fourth switching contacts causes the third common terminal to switch from connecting to the third normally closed terminal to connecting to the third normally open terminal;
   a fourth set of terminals comprising a fourth common terminal, a fourth normally closed terminal, and a fourth normally open terminal, wherein energizing the third and fourth switching contacts causes the fourth common terminal to switch from connecting to the fourth normally closed terminal to connecting to the fourth normally open terminal;
   a fifth set of terminals comprising a fifth common terminal, a fifth normally closed terminal, and a fifth normally open terminal, wherein energizing the first and second switching contacts causes the fifth common terminal to switch from connecting to the fifth normally closed terminal to the fifth normally open terminal;
   a sixth set of terminals comprising a sixth common terminal, a sixth normally closed terminal, and a sixth normally open terminal, wherein energizing the third and fourth switching contacts causes the sixth common terminal to switch from connecting to the sixth normally closed terminal to the sixth normally open terminal;
   a persistent connection between each of the switching contacts and a respective common terminal of the terminal sets;
   a persistent connection between the first normally closed terminal and the third switching contact;
   a persistent connection between the first normally open contact and the fourth normally open contact;
   a persistent connection between the second normally open contact and the third normally open contact and the fourth normally closed contact;
   a first output in connection with the first normally open terminal and in connection with the fourth normally open terminal;
   a second output in connection with the third normally closed terminal;
   a third output in connection with the second normally open terminal and in connection with the third normally open terminal and in connection with the fourth normally closed terminal;
   a first input connected to the first switching contact;
   a second input connected to fifth common terminal;
   and a third input connected to the second switching contact,
   wherein the first, second and third outputs are configured for connection to a load, and
   wherein the first, second, and third inputs are configured for connection to two hot outputs of an electrical power source.

2. The device of claim 1, wherein the first, second, and third outputs are configured to be connectable to an electrical outlet.

3. The device of claim 1, wherein the device is configured to be housed in combination with an appliance for industrial or household use.

4. The device of claim 1, further comprising:
   a persistent connection between the first normally open terminal and the sixth normally closed terminal;
   a persistent connection between the fifth normally closed terminal and the fourth switching contact;
   a persistent connection between the fifth normally open terminal and third normally closed terminal and the sixth normally open terminal; and
   a persistent connection between the second normally closed terminal and the sixth common terminal.

5. The device of claim 1, wherein the first output is further connected to the sixth normally closed terminal, and wherein the second output is further connected to the fifth normally open terminal and the sixth normally open terminal.

* * * * *